(12) United States Patent
Miyazawa et al.

(10) Patent No.: US 11,592,775 B2
(45) Date of Patent: Feb. 28, 2023

(54) IMAGE FORMING APPARATUS

(71) Applicant: CANON KABUSHIKI KAISHA, Tokyo (JP)

(72) Inventors: Toru Miyazawa, Chiba (JP); Noriaki Adachi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/575,240

(22) Filed: Jan. 13, 2022

(65) Prior Publication Data

US 2022/0260949 A1 Aug. 18, 2022

(30) Foreign Application Priority Data

Feb. 12, 2021 (JP) .............................. JP2021-020826
Dec. 14, 2021 (JP) .............................. JP2021-202663

(51) Int. Cl.
*G03G 15/00* (2006.01)
*H02P 5/68* (2006.01)
*H02P 25/03* (2016.01)
*B65H 3/06* (2006.01)
*B65H 5/06* (2006.01)
*B65H 29/20* (2006.01)

(52) U.S. Cl.
CPC ......... *G03G 15/6511* (2013.01); *G03G 15/50* (2013.01); *G03G 15/6558* (2013.01); *H02P 5/68* (2013.01); *H02P 25/03* (2016.02); *B65H 3/06* (2013.01); *B65H 5/06* (2013.01); *B65H 29/20* (2013.01); *B65H 2403/92* (2013.01)

(58) Field of Classification Search
CPC .... G03G 15/6529; G03G 15/80; G03G 15/50; G03G 2221/1657
See application file for complete search history.

(56) References Cited

U.S. PATENT DOCUMENTS

| | | | |
|---|---|---|---|
| 2015/0145454 A1* | 5/2015 | Kameyama | ........ G03G 15/5008 318/400.34 |
| 2019/0341866 A1 | 11/2019 | Fujimori | |
| 2020/0017322 A1* | 1/2020 | Adachi | ..................... B65H 3/06 |
| 2020/0119677 A1* | 4/2020 | Takahashi | ............... H02P 21/32 |

\* cited by examiner

*Primary Examiner* — Jessica L Eley
(74) *Attorney, Agent, or Firm* — Canon U.S.A., Inc. I.P. Division

(57) ABSTRACT

An image forming apparatus includes a stacking portion, a pickup roller, a motor, an image forming unit, and a controller. Upon receiving an instruction for starting a first image forming job, the controller performs an initial operation of supplying current to a motor winding of the motor in a stop state and determining a phase of the rotor based on the flowing current. Based on the determined phase, the controller supplies current to rotate the rotor from its stop state and holds the rotor at a first phase when the first job ends. Upon receiving start instructions for a second image forming job within a period until a predetermined time elapses from when the rotor is held at the first phase, the controller rotates the rotor without performing the initial operation. The controller stops supplying current to the winding if no instructions are not received for starting the second job.

34 Claims, 13 Drawing Sheets

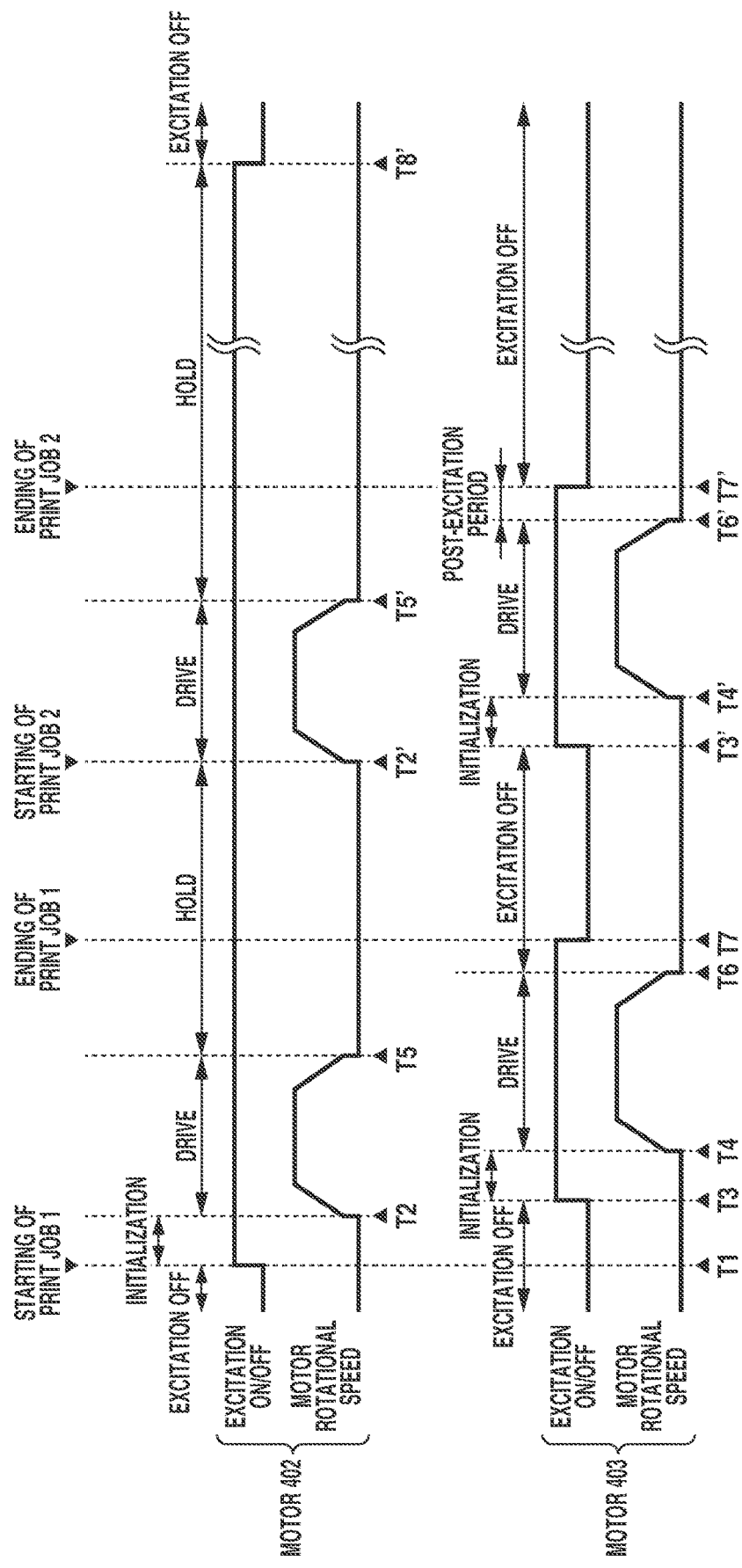

IMAGE FORMING APPARATUS

BACKGROUND

Field

Aspects of the present disclosure generally relate to control of a motor in an image forming apparatus.

Description of the Related Art

Heretofore, there is known a technique which, in starting up a brushless direct-current (DC) motor, estimates the stop position (initial position) of a rotor of the brushless DC motor with use of inductance changing depending on the position of the rotor. U.S. Patent Application Publication No. US 2015/0145454 discusses a configuration which estimates the initial position based on a responsiveness of electric current obtained at the time of a voltage being applied to windings of the brushless DC motor and starts driving of the brushless DC motor based on the estimated initial position.

In an image forming apparatus, in a case where, after excitation of the windings is cut off by stopping driving of a brushless DC motor, which drives a conveyance roller for conveying a recording medium, driving of the brushless DC motor is started, there is a possibility of the following things occurring. Specifically, the position of the rotor obtained at the time of starting of driving of the brushless DC motor may be a position different from the position at which the rotor has stopped, due to, for example, vibration of the image forming apparatus. Therefore, to start driving of the brushless DC motor after excitation of the windings of the brushless DC motor is cut off, it is necessary to perform the above-mentioned estimation of the initial position. The operation of estimating the initial position requires a predetermined time.

U.S. Patent Application Publication No. US 2019/0341866 discusses a configuration in which, in an image forming apparatus, the rotor of a brushless DC motor which drives a registration roller for performing skew correction of a recording medium is held after ending of a print job 1. U.S. Patent Application Publication No. US 2019/0341866 also discusses that this configuration enables omitting an operation of estimating the initial position of the rotor of the brushless DC motor which drives the registration roller, when an instruction for starting a print job 2 after ending of the print job 1 is issued. Additionally, U.S. Patent Application Publication No. US 2019/0341866 also discusses that this configuration enables shortening a first print output time (FPOT), which is a time required until the first sheet of a recording medium is output from the time of an instruction for printing being issued by the user, in the print job 2.

In the configuration discussed in U.S. Patent Application Publication No. US 2019/0341866, even if the operation of estimating the initial position in the motor which drives the registration roller is omitted, unless an operation of estimating an initial position in a motor which drives a pickup roller for feeding a recording medium stacked in a stacking tray is omitted, it is impossible to shorten an FPOT of the print job 2 in the image forming apparatus. However, in U.S. Patent Application Publication No. US 2019/0341866, although there is a description about control of a brushless DC motor which drives the registration roller, there is no description about control of a motor which drives the pickup roller. Thus, the configuration discussed in U.S. Patent Application Publication No. US 2019/0341866 is not able to shorten an FPOT of the print job 2.

Moreover, in the configuration discussed in U.S. Patent Application Publication No. US 2019/0341866, there is a possibility that, to omit an operation of estimating the initial position, the rotor is always held during a period until an instruction for starting the print job 2 is issued after ending of the print job 1. For example, in a case where the period until an instruction for starting the print job 2 is issued after ending of the print job 1 is several tens of minutes or more, electrical power consumed during that period in the configuration discussed in U.S. Patent Application Publication No. US 2019/0341866 becomes larger than electrical power consumed in a case where the rotor is not held during that period.

SUMMARY

Aspects of the present disclosure are generally directed to providing an image forming apparatus capable of shortening an FPOT while reducing power consumption in the image forming apparatus.

According to an aspect of the present disclosure, an image forming apparatus includes a stacking portion on which a recording medium is to be stacked, a pickup roller configured to feed the recording medium stacked on the stacking portion, a motor configured to drive the pickup roller, an image forming unit configured to form an image on the recording medium fed by the pickup roller, and a controller configured to perform operations including: receiving an instruction for starting an image forming job for forming the image on the recording medium, performing an initial operation upon receiving an instruction for starting a first job serving as the image forming job, in the initial operation, wherein, by the initial operation, the controller supplies current to a winding of the motor in a stop state in which a rotor of the motor is at a stop and determines a phase of the rotor having been in the stop state based on the current flowing through the winding of the motor, and controlling the current to be supplied to the winding in such a manner that the rotor having been in the stop state rotates, based on the phase determined by the initial operation, wherein, in a case where the first job ends, the controller controls the current to be supplied to the winding in such a manner that the rotor is held at a first phase, wherein, upon receiving an instruction for starting a second job serving as the image forming job within a period until a predetermined time elapses from when the rotor is held at the first phase due to the ending of the first job, the controller controls the current to be supplied to the winding in such a manner that the rotor having being held rotates without performing the initial operation, and wherein, upon not receiving the instruction for starting the second job within the period, the controller stops supplying the current to the winding.

Further features of the present disclosure will become apparent from the following description of exemplary embodiments with reference to the attached drawings.

BRIEF DESCRIPTION OF THE DRAWINGS

FIG. 12 is a diagram illustrating drive sequences of the motors.

DESCRIPTION OF THE EMBODIMENTS

Various exemplary embodiments, features, and aspects of the disclosure will be described in detail below with reference to the drawings. However, for example, shapes and relative locations of component parts described in the exemplary embodiments can be changed or altered as appropriate according to configurations of apparatuses to which the present disclosure is applied and various conditions thereof, and the scope of the present disclosure should not be construed to be limited to the following exemplary embodiments.

[Image Forming Apparatus]

Figure 1:
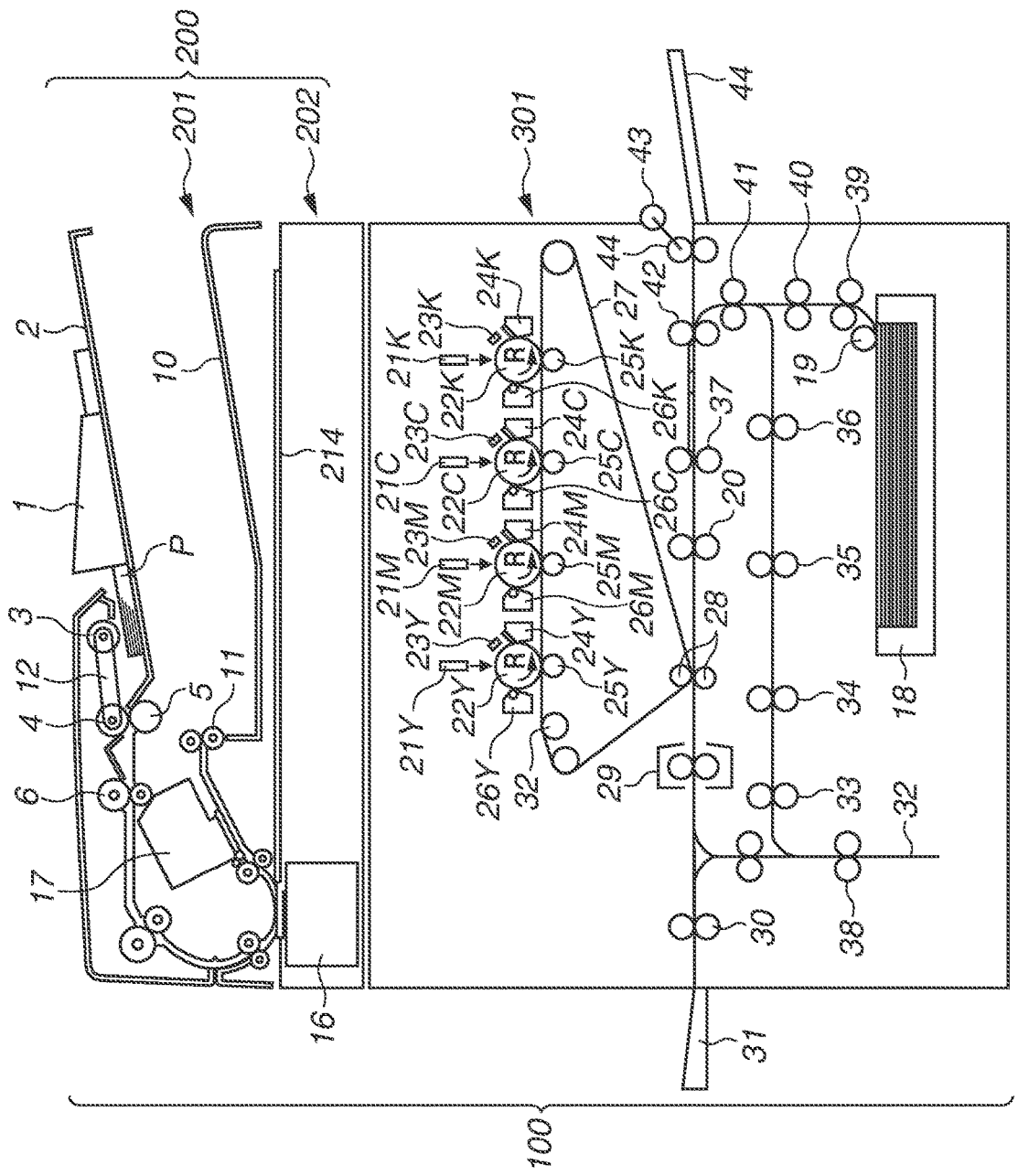
FIG. 1 is a sectional view illustrating an image forming apparatus.

FIG. 1 is a sectional view illustrating a configuration of a color electrophotographic-type copying machine (hereinafter referred to as an "image forming apparatus") 100 for use in a first exemplary embodiment. Furthermore, the image forming apparatus is not limited to a copying machine, but can be, for example, a facsimile apparatus, a printing machine, or a printer. Moreover, the recording method is not limited to an electrophotographic type, but can be, for example, an inkjet type. Additionally, the form of the image forming apparatus can be any one of monochrome and color forms.

In the following description, the configuration and function of the image forming apparatus 100 are described with reference to FIG. 1. As illustrated in FIG. 1, the image forming apparatus 100 includes a document reading device 200, which includes a document feeding device 201 and a reading device 202, and an image printing device 301.

<Document Reading Device>

Documents P stacked in a document stacking portion 2 of the document feeding device 201 are fed one by one by a pickup roller 3, and are then further conveyed toward the downstream side by a feed roller 4. A separation roller 5, which is in pressure contact with the feed roller 4, is provided at a position facing the feed roller 4. The separation roller 5 is configured to rotate in response to a load torque larger than or equal to a predetermined torque being applied to the separation roller 5 and has the function of separating documents which have been fed in the state of two sheets overlapping each other.

The pickup roller 3 and the feed roller 4 are coupled to each other by a swinging arm 12. The swinging arm 12 is supported by a rotation shaft of the feed roller 4 in such a way as to be able to rotate around the rotation shaft of the feed roller 4.

Each document P is conveyed by the feed roller 4 and other rollers and is then discharged to a discharge tray 10 by a discharge roller 11.

The reading device 202 includes a document reading unit 16, which reads an image of the first surface of the document being conveyed. Image information obtained by the document reading unit 16 performing reading is output to the image printing device 301.

Moreover, the document feeding device 201 includes a document reading unit 17, which reads an image of the second surface of the document being conveyed. Image information obtained by the document reading unit 17 performing reading is output to the image printing device 301 in a manner similar to the method described with regard to the document reading unit 16.

Reading of each document is performed in a manner described above.

Moreover, reading modes for documents include a first reading mode and a second reading mode. The first reading mode is a mode for reading the image of a document being conveyed in the above-mentioned method. The second reading mode is a mode for reading the image of a document placed on a document positioning glass 214 of the reading device 202 with the document reading unit 16 being moving at a predetermined speed. Usually, the image of a sheet-like document is read in the first reading mode, and the image of a bound document such as a book or booklet is read in the second reading mode.

<Image Printing Device>

The inside of the image printing device 301 includes a sheet storage tray 18, which stores a recording medium. Furthermore, the recording medium is a thing on which an image is able to be formed by an image forming apparatus, and examples of the recording medium include paper, resin sheet, cloth, overhead projector (OHP) sheet, and label.

A recording medium stored in the sheet storage tray 18 is fed out by a pickup roller 19 and is then fed to a registration roller 20 by conveyance rollers 39, 40, 41, and 42 and other rollers.

Moreover, the image printing device 301 includes a manual feed tray 44, on which to stack a recording medium. A recording medium stacked on the manual feed tray 44 is fed out by a pickup roller 43 and is then fed to the registration roller 20 by conveyance rollers 44 and 42 and other rollers.

The front edge of a recording medium being conveyed by a pre-registration roller 37 collides with the registration roller 20. As a result, a loop is formed in the recording medium between the registration roller 20 and the pre-registration roller 37, so that skewing of the recording medium is corrected (reduced).

An image signal output from the document reading device 200 is input, for the respective color components thereof, to optical scanning devices 21Y, 21M, 21C, and 21K each including a semiconductor laser and a polygon mirror. Specifically, an image signal for yellow output from the document reading device 200 is input to the optical scanning device 21Y, and an image signal for magenta output from the document reading device 200 is input to the optical scanning device 21M. Moreover, an image signal for cyan output from the document reading device 200 is input to the optical scanning device 21C, and an image signal for black output from the document reading device 200 is input to the optical scanning device 21K. Furthermore, while, in the following description, a configuration in which an image for yellow is formed is described, the same also applies to configurations for magenta, cyan, and black.

The outer circumferential surface of a photosensitive drum 22Y is electrically charged by a charging device 23Y. After the outer circumferential surface of the photosensitive drum 22Y is electrically charged, laser light corresponding to an image signal input from the document reading device 200 to the optical scanning device 21Y is radiated from the optical scanning device 21Y onto the outer circumferential surface of the photosensitive drum 22Y via an optical system such as a polygon mirror and a mirror. As a result, an electrostatic latent image is formed on the outer circumferential surface of the photosensitive drum 22Y.

Subsequently, the electrostatic latent image is developed by toner stored in a developing device 24Y serving as a developing unit, so that a toner image is formed on the outer circumferential surface of the photosensitive drum 22Y. The toner image formed on the photosensitive drum 22Y is transferred to a transfer belt 27 serving as an intermediate transfer member by a transfer roller 25Y provided at a position facing the photosensitive drum 22Y. Furthermore, toner having remained on the outer circumferential surface of the photosensitive drum 22Y after the toner image is transferred to the transfer belt 27 is recovered by a cleaning unit 26Y.

Toner images for yellow, magenta, cyan, and black transferred to the transfer belt 27 are transferred to a recording medium by a transfer roller pair 28. Since a high voltage is being applied to the transfer roller pair 28, the toner images are transferred to the recording medium due to the high voltage. In conformity with this transfer timing, the registration roller 20 feeds the recording medium to the transfer roller pair 28.

The recording medium with the toner images transferred thereto in the above-mentioned manner is fed to a fixing device 29 serving as a fixing unit, and the toner images are fixed to the recording medium by being heated and pressed by the fixing device 29. In this way, an image is formed on the recording medium by the image forming apparatus 100.

In a case where image formation is performed in one-sided printing mode, the recording medium having passed through the fixing device 29 is discharged to a discharge tray 31 by a discharge roller 30. Moreover, in a case where image formation is performed in two-sided printing mode, after fixing processing is performed on the first surface of the recording medium by the fixing device 29, the recording medium is conveyed to a reversing path 32 by a reversing roller 38. The recording medium conveyed to the reversing path 32 is reversed between the first surface and the second surface by the reversing roller 38 and is then conveyed to a conveyance guide in which conveyance rollers 33, 34, 35, and 36 and other rollers are provided. The recording medium is conveyed to the registration roller 20 again by the conveyance rollers 33, 34, 35, and 36 and other rollers, so that an image is formed on the second surface of the recording medium in the above-mentioned method. After that, the recording medium is discharged to the discharge tray 31 by the discharge roller 30.

Thus far is the description of the configuration and function of the image forming apparatus 100.

<Control Configuration of Image Forming Apparatus>

Figure 2:
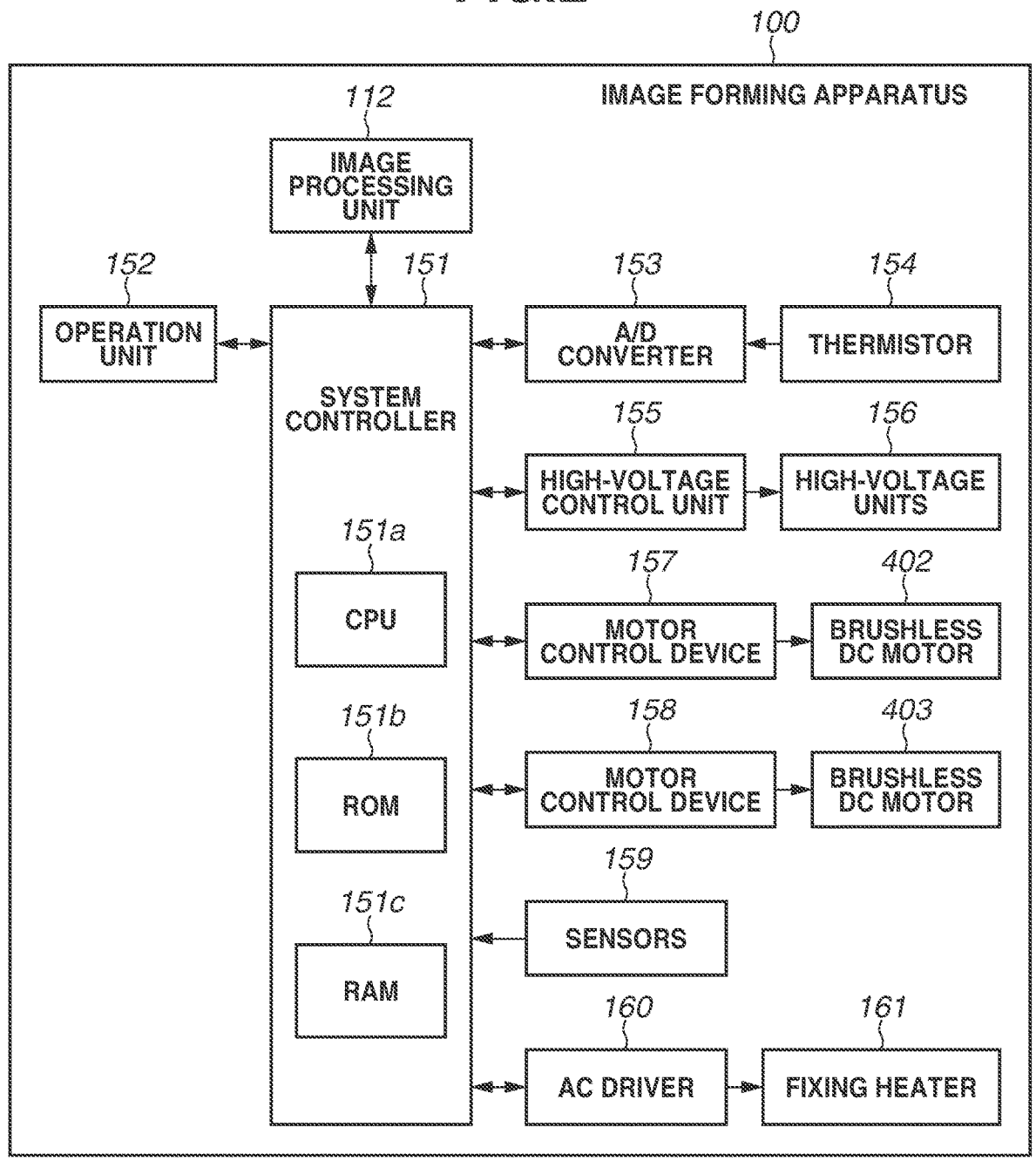
FIG. 2 is a block diagram illustrating a control configuration of the image forming apparatus in a first exemplary embodiment.

FIG. 2 is a block diagram illustrating an example of a control configuration of the image forming apparatus 100. A system controller 151 includes, as illustrated in FIG. 2, a central processing unit (CPU) 151a, a read-only memory (ROM) 151b, and a random access memory (RAM) 151c. Moreover, the system controller 151 is connected to an image processing unit 112, an operation unit 152, an analog-to-digital (A/D) converter 153, a high-voltage control unit 155, motor control devices 157 and 158, sensors 159, and an alternating-current (AC) driver 160. The system controller 151 is able to perform transmission and reception of data and commands with respect to the various connected units.

The CPU 151a performs various sequences concerning a previously determined image forming sequence by reading out and executing various programs stored in the ROM 151b.

The RAM 151c is a storage device. The RAM 151c stores various pieces of data, such as setting values for the high-voltage control unit 155, command values for the motor control devices 157 and 158, and information received from the operation unit 152.

The system controller 151 transmits, to the image processing unit 112, setting value data for the various devices provided inside the image forming apparatus 100, which is required for image processing to be performed by the image processing unit 112. Additionally, the system controller 151 receives signals output from the sensors 159 and sets the setting values for the high-voltage control unit 155 based on the received signals.

The high-voltage control unit 155 supplies voltages required for high-voltage units 156 (such as the charging devices 23Y, 23M, 23C, and 23K, the developing devices 24Y, 24M, 24C, and 24K, and the transfer roller pair 28) according to the setting values set by the system controller 151.

The motor control device 157 controls a brushless direct-current (DC) motor 402 according to a command output from the CPU 151a. Moreover, the motor control device 158 controls a brushless DC motor 403 according to a command output from the CPU 151a. Furthermore, while, in FIG. 2, only two motor control devices are illustrated, three or more motor control devices can be provided in the image forming apparatus 100. Moreover, while, in FIG. 2, only two motors are illustrated, actually, three or more motors are provided in the image forming apparatus 100. Moreover, a single motor control device can be configured to control a plurality of motors.

The A/D converter 153 receives a detection signal detected by a thermistor 154, which is provided for detecting the temperature of a fixing heater 161, converts the detection signal from an analog signal into a digital signal, and transmits the digital signal to the system controller 151. The system controller 151 performs control of the AC driver 160 based on the digital signal received from the A/D converter 153. The AC driver 160 controls the fixing heater 161 in such a manner that the temperature of the fixing heater 161 becomes a temperature required for performing fixing processing. Furthermore, the fixing heater 161 is a heater for use in fixing processing and is included in the fixing device 29.

The system controller 151 controls the operation unit 152 in such a way as to display an operation screen used for the user to perform setting of an image forming condition such as the type of a recording medium to be used (hereinafter referred to as a "paper type") on a display unit provided in the operation unit 152. The system controller 151 receives information set by the user from the operation unit 152 and controls an operation sequence of the image forming apparatus 100 based on the information set by the user. Moreover, the system controller 151 transmits information indicating the state of the image forming apparatus 100 to the operation unit 152. Furthermore, the information indicating the state of the image forming apparatus 100 is information about, for example, the number of image-formed sheets, the progress status of an image forming operation, and jam or double feed occurring in the document feeding device 201 and the image printing device 301. The operation unit 152 displays the information received from the system controller 151 on the display unit. Furthermore, in the first exemplary embodiment, during a period in which the operation unit 152 is being performed, for example, setting data in the operation unit 152 is transmitted from the operation unit 152 to the CPU 151a at a predetermined time interval.

In the above-described way, the system controller 151 controls the operation sequence of the image forming apparatus 100.

{Electric Power Mode}

In the first exemplary embodiment, a switch which is to be operated by the user to switch the electric power mode of the image forming apparatus 100 is provided in the operation unit 152. The image forming apparatus 100 has, as the electric power mode, a normal power mode and a power saving mode (sleep mode).

The state in which the electric power mode is the normal power mode is a state in which printing (image formation) on a recording medium by the image printing device 301 is ready to be performed. In the normal power mode, for example, electric power is supplied to, for example, the system controller 151, the high-voltage control unit 155, the motor control devices 157 and 158, and the AC driver 160.

Moreover, the state in which the electric power mode is the power saving mode is a state in which power consumption is smaller than in the normal power mode and printing (image formation) on a recording medium by the image printing device 301 is unready to be performed. In the power saving mode, for example, while electric power is supplied to the system controller 151, electric power is not supplied to, for example, the high-voltage control unit 155, the motor control devices 157 and 158, and the AC driver 160.

[Motor Control Device]

Next, the motor control device 157 is described. Furthermore, the motor control device 158 has the same configuration as that of the motor control device 157 and is, therefore, omitted from description. A brushless DC motor 402 (hereinafter referred to as a "motor 402") and a brushless DC motor 403 (hereinafter referred to as a "motor 403"), which are described below, are not provided with sensors, such as Hall elements), for detecting the rotational phase of a rotor of the motor.

Figure 3:
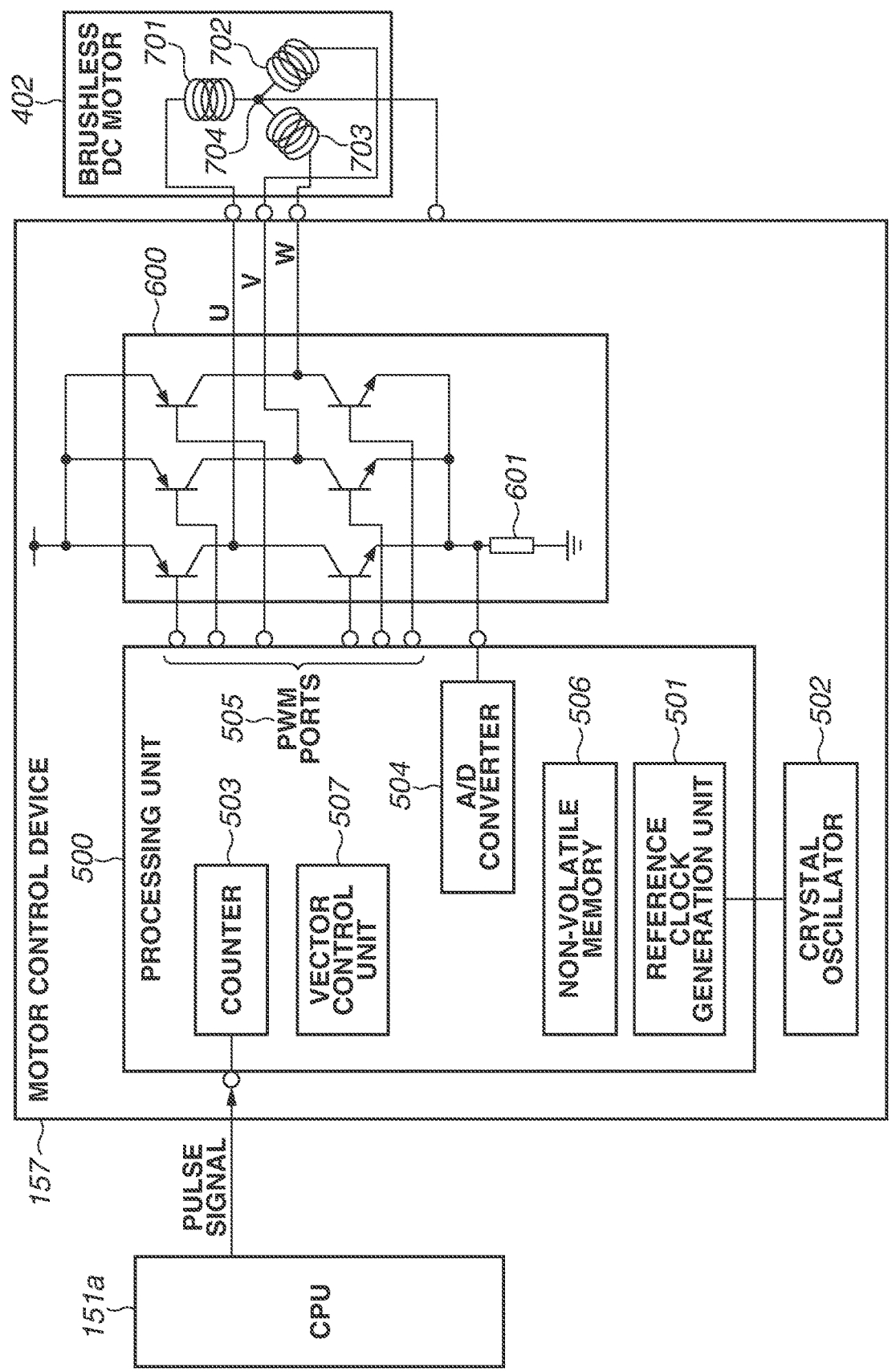
FIG. 3 is a block diagram illustrating a configuration of a motor control device.

FIG. 3 is a block diagram illustrating an example of a configuration of the motor control device 157. Furthermore, the motor control device 157 is configured with at least one application specific integrated circuit (ASIC), and performs various functions described below.

The motor control device 157 includes a processing unit 500. The processing unit 500 includes a reference clock generation unit 501, a counter 503, an A/D converter 504, a non-volatile memory 506, and a vector control unit 507.

The reference clock generation unit 501 generates a reference clock signal based on a signal output from a crystal oscillator 502. The counter 503 counts a pulse signal output from the CPU 151a and determines the period of the pulse signal based on a counted value and the reference clock signal.

A pulse width modulation (PWM) ports 505 output PWM signals for driving respective switching elements of a three-phase inverter 600. The switching elements of the three-phase inverter 600 are, for example, field-effect transistors (FETs), and, in response to the FETs being driven by the PWM signals, electric currents are supplied to a plurality of windings 701 (U phase), 702 (V phase), and 703 (W phase) of the motor 402.

The currents supplied to the respective windings 701, 702, and 703 are detected by a resistor 601 and the A/D converter 504. Specifically, a voltage between both ends of the resistor 601 is converted by the A/D converter 504 from an analog signal into a digital signal, so that the currents supplied to the respective windings 701, 702, and 703 are detected.

Furthermore, while, in the first exemplary embodiment, currents flowing through the respective phase windings are detected by the resistor 601, which is provided at a point where the U phase, V phase, and W phase wirings are interconnected, the first exemplary embodiment is not limited to this configuration. For example, a current flowing through the W-phase winding can be calculated based on currents detected by respective resistors provided at the U-phase wiring and the V-phase wiring, or currents flowing through the respective phase windings can be detected by respective resistors provided at the U-phase, V-phase, and W-phase wirings. Thus, a current flowing through each phase winding only needs to be detected by a known technique.

<Structure of Motor>

Figure 4:
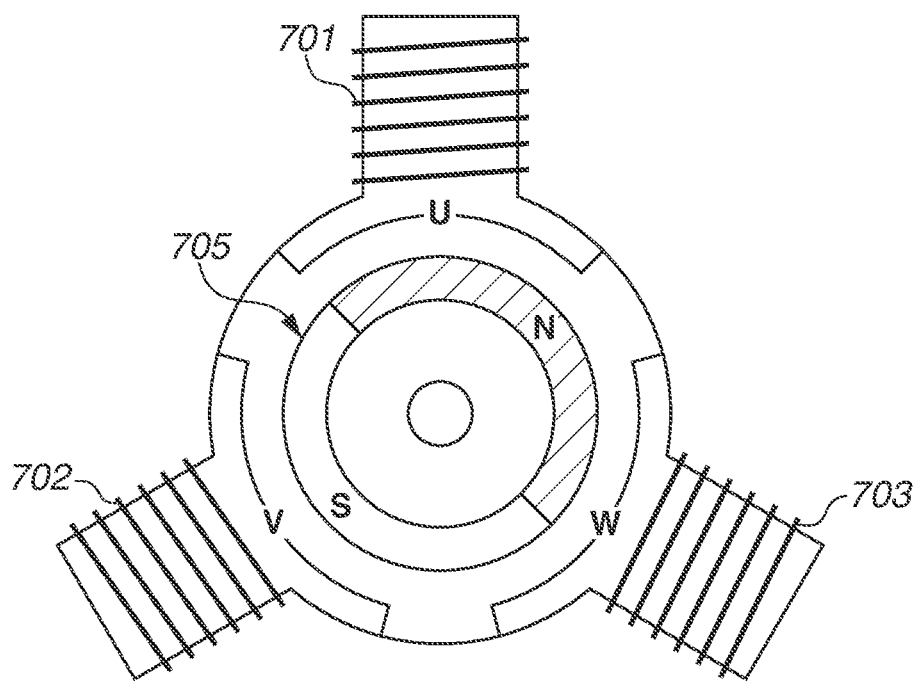
FIG. 4 is a diagram used to explain a structure of a motor.

FIG. 4 is a diagram used to explain a structure of the motor 402 (motor 403). In the first exemplary embodiment, the motor 402 includes windings 701, 702, and 703 for the respective three phases (U phase, V phase, and W phase) wound around portions of the stator thereof.

A rotor 705 is configured with a permanent magnet and has a north (N) pole and a south (S) pole. The stop position (rotational phase at the time of stop) of the rotor 705 is determined by a combination of the windings 701, 702, and 703 being excited, i.e., an excitation phase. Here, in the following description, "exciting X-Y phase" is assumed to mean "performing excitation in such a manner that the X phase becomes an N pole and the Y phase becomes an S pole.

<Detection of Stop Position>

Next, detection of the phase (stop position) of the rotor 705 in a state in which the rotor 705 is at a stop is described. In the first exemplary embodiment, the stop position of the rotor 705 is detected through the use of the inductances of the respective windings 701, 702, and 703 varying depending on the stop position of the rotor 705.

Generally, a winding is configured with a copper wire wound around a core composed of stacked magnetic steel sheets. Moreover, the magnetic permeability of a magnetic steel sheet becomes small in a case where there is an external magnetic field. Thus, in a case where there is an external magnetic field, the inductance of a winding, which is proportional to the magnetic permeability of a core, also becomes small.

For example, as illustrated in FIG. 4, in a case where the rotor 705 is at a stop in such a manner that the center of the area of the S pole of the rotor 705 is situated at a position facing the winding 702 for V phase, since the influence of an external magnetic field caused by the rotor 705 is large, the rate of decrease in inductance of the winding 702 is large.

The rate of decrease in inductance also varies depending on the direction of a current flowing through the winding for V phase.

Specifically, in a case where the direction of a magnetic field caused by a current flowing through the winding 702 is the same as the direction of an external magnetic field caused by the rotor 705, the rate of decrease in inductance is larger than in a case where the direction of a magnetic field caused by a current flowing through the winding 702 is opposite to the direction of an external magnetic field caused by the rotor 705. Thus, in the case of the example illustrated in FIG. 4, the rate of decrease in inductance is larger in a case where the V phase (winding 702) is excited to the N pole than in a case where the V phase (winding 702) is excited to the S pole.

On the other hand, in the state illustrated in FIG. 4, both the S pole and the N pole of the rotor 705 are facing the W phase (winding 703). Therefore, the influence of an external magnetic field caused by the rotor 705 is small and the rate of decrease in inductance of the winding 703 is small.

In this way, the inductances of the respective windings 701, 702, and 703 depend on the stop position of the rotor 705.

Figure 5A:
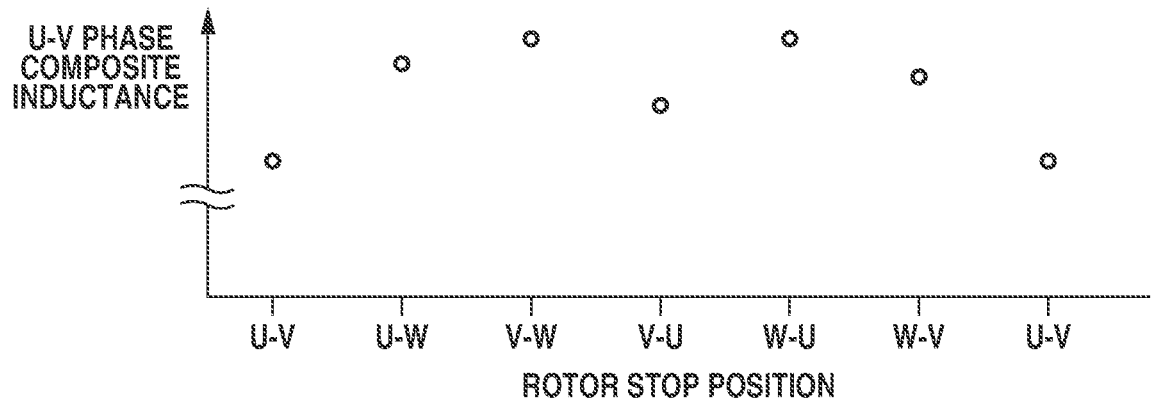
FIGS. 5A, 5B, and 5C are diagrams illustrating a relationship between a stop position of a rotor and an excitation phase.

FIG. 5A illustrates a relationship between the stop position of the rotor 705 and a composite inductance of the U-V phase, which is one of excitation phases. Furthermore, in the subsequent description, the stop position of the rotor 705 is assumed to be expressed by an excitation phase thereof. Moreover, the composite inductance of the U-V phase is assumed to mean a composite inductance of the winding 701 and the winding 702 measured with currents flowing in such a way as to set the U phase to the N pole and set the V phase to the S pole.

In the first exemplary embodiment, an inductance is detected by a physical quantity which varies according to a change of the inductance being detected. For example, since the fastness of rise of a current (voltage) flowing through a winding differs depending on the value of inductance, such a fastness of rise is measured.

Figure 5B:
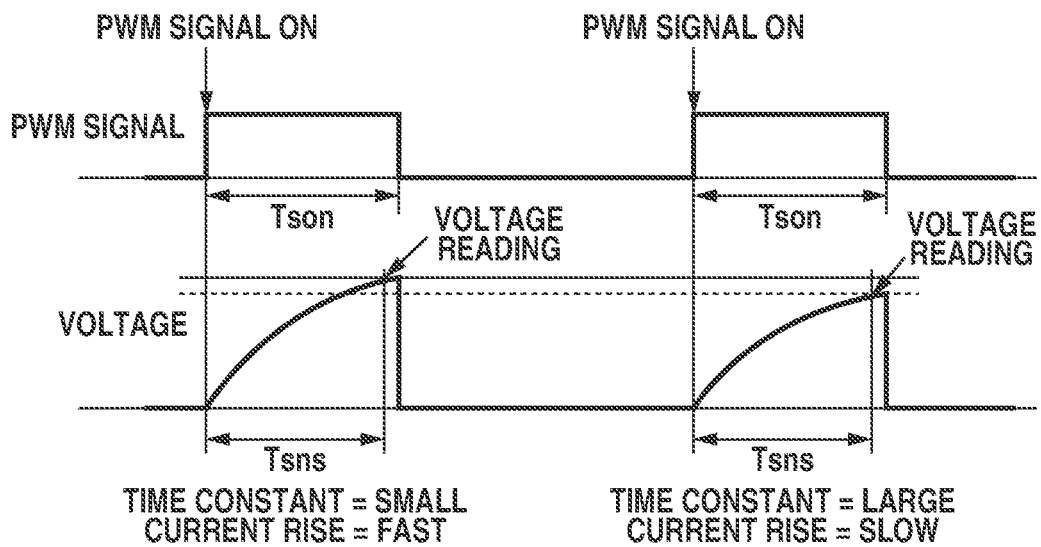

Specifically, as illustrated in FIG. 5B, the processing unit 500 turns on the PWM signal only for a predetermined period Tson. Then, the processing unit 500 detects, with the A/D converter 504, a voltage occurring in the resistor 601 a predetermined time after the timing of the PWM signal being turned on (after a time Tsns), thus measuring the fastness of rise. Furthermore, the predetermined period Tson is assumed to be a period in which the rotor 705 is never moved by a generated torque. A relationship between the stop position of the rotor 705, an excitation phase in which to apply a current, and a voltage generated in the resistor 601 is previously stored in the non-volatile memory 506.

Figure 5C:
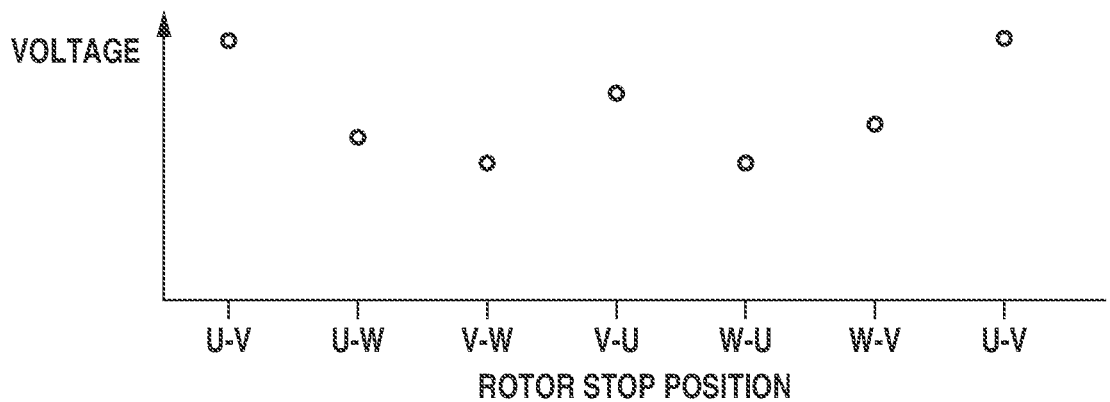

FIG. 5C illustrates a relationship between the stop position of the rotor 705 and a voltage occurring in the resistor 601 at the time of a current flowing to the U-V phase. As illustrated in FIG. 5C, the voltage occurring in the resistor 601 at the time of a current flowing to the U-V phase becomes maximum in a case where the stop position of the rotor 705 is a position for the U-V phase. Since, in this way, a voltage occurring in the resistor 601 differs depending on the stop position of the rotor 705, the processing unit 500 is able to determine the stop position of the rotor 705 based on a voltage occurring in the resistor 601. Specifically, for example, the processing unit 500 measures a voltage occurring in the resistor 601 (i.e., a current flowing through windings) obtained a predetermined time after a current is caused to flow to one or more excitation phases and determines the stop position of the rotor 705 based on information stored in the non-volatile memory 506.

Furthermore, the above-mentioned method of detecting the stop position is merely an example in the first exemplary embodiment, and the first exemplary embodiment is not limited to this method. Thus, a known technique which detects the stop position based on currents flowing through windings without using a Hall element or a rotary encoder for detecting the stop position of a rotor only needs to be used.

<Control of Motor>
{Synchronous Control}

After the stop position of the rotor 705 is detected, the motor control device 157 determines an excitation phase for fixing the rotor 705 to the detected stop position, and controls the three-phase inverter 600 in such a manner that currents are supplied to the determined excitation phase.

The CPU 151a outputs a pulse signal to the motor control device 157 based on the operation sequence of the motor 402. The number of pulse signals corresponds to a target phase of the rotor 705, and the frequency of a pulse signal corresponds to a target speed of the rotor 705.

The motor control device 157 progressively switches excitation phases each time a pulse signal is input from the CPU 151a. For example, when a pulse signal is input after the U-V phase is excited, the motor control device 157 controls the three-phase inverter 600 in such a way as to excite the U-W phase. When a pulse signal is further input, the motor control device 157 controls the three-phase inverter 600 in such a way as to excite the V-W phase. In the first exemplary embodiment, after detecting the stop position of the rotor 705, the motor control device 157 performs synchronous control for driving the motor 402 according to a pulse signal output from the CPU 151a in the above-described way. Furthermore, in the synchronous control, drive currents flowing through the windings 701, 702, and 703 are controlled in such a manner that currents with a predetermined magnitude flow through the windings 701, 702, and 703. Specifically, to prevent a motor from losing steps even if a variation in load torque applied to a rotor occurs, drive currents with a magnitude (amplitude) corresponding to a torque obtained by adding a predetermined margin to a torque supposed to be required for rotation of the rotor are supplied to the windings. This is because, in the synchronous control, since a configuration in which the magnitude of a drive current is controlled based on the determined (estimated) rotational phase or rotational speed is not used (feedback control is not performed), it is not possible to adjust a drive current according to a load torque applied to the rotor. Furthermore, as the magnitude of a current is larger, a torque applied to the rotor becomes larger. Moreover, the amplitude corresponds to the magnitude of a current vector.

{Vector Control}

In the first exemplary embodiment, in a state in which the motor control device 157 is performing synchronous control, when the frequency of a pulse signal output from the CPU 151a (i.e., a value corresponding to a target speed of the rotor 705) becomes a predetermined value or more, the motor control device 157 performs vector control using the vector control unit 507. Furthermore, in a state in which the motor control device 157 is performing vector control, the motor control device 157 performs synchronous control when the frequency of a pulse signal output from the CPU 151a becomes smaller than the predetermined value. Furthermore, a configuration in which, in a state in which the motor control device 157 is performing synchronous control, when a rotational speed w described below becomes a predetermined value or more, the motor control device 157 performs vector control using the vector control unit 507 can be employed. Thus, a configuration in which, in a state in which the motor control device 157 is performing synchronous control, when a value corresponding to the rotational speed of a rotor becomes a predetermined value or more, the motor control device 157 performs vector control using the vector control unit 507 only needs to be employed.

Figure 6:
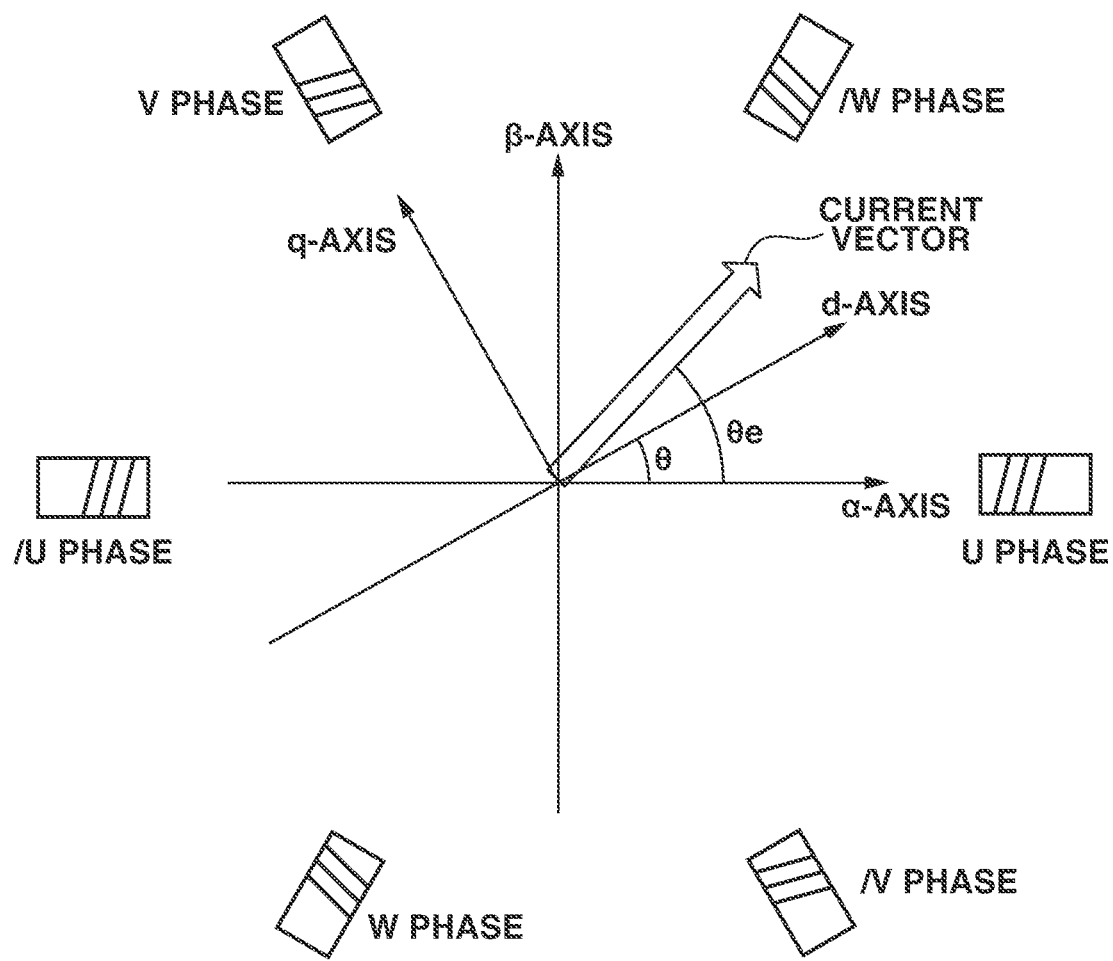
FIG. 6 is a diagram illustrating a relationship between the U phase, V phase, W phase, and a rotating coordinate system expressed by the d-axis and q-axis.

FIG. 6 is a diagram illustrating a relationship between the U phase, V phase, W phase, and a rotating coordinate system expressed by the d-axis and q-axis. In FIG. 6, in a coordinate system at rest, an a-axis which is an axis corresponding to the winding for U phase and a β-axis which is an axis perpendicular to the a-axis are defined. Moreover, in FIG. 6, the d-axis is defined along the direction of a magnetic flux generated by magnetic poles of a permanent magnet for use in the rotor 705, and the q-axis is defined along a direction swung 90 degrees counterclockwise from the d-axis (a direction perpendicular to the d-axis).

An angle between the α-axis and the d-axis is defined as θ, and the rotational phase of the rotor 705 is expressed by the angle θ. In vector control, a rotating coordinate system that is based on the rotational phase θ is used. Specifically, in vector control, a q-axis component for causing the rotor to generate a torque (a torque current component) and a d-axis component affecting the intensity of a magnetic flux penetrating through windings (an exciting current component), which are current components in the rotating coordinate system, in a current vector corresponding to a drive current flowing through the windings are used. Furthermore, in FIG. 6, the direction in which the rotor 705 rotates counterclockwise is illustrated as a positive direction.

The vector control is a control method for controlling a motor by performing speed feedback control for controlling the value of the torque current component and the value of the exciting current component in such a manner that a deviation between a command speed representing a target speed of the rotor and an actual rotational speed becomes small. Moreover, there is also a method for controlling a motor by performing phase feedback control for controlling the value of the torque current component and the value of the exciting current component in such a manner that a deviation between a command phase representing a target phase of the rotor and an actual rotational phase becomes small.

Figure 7:
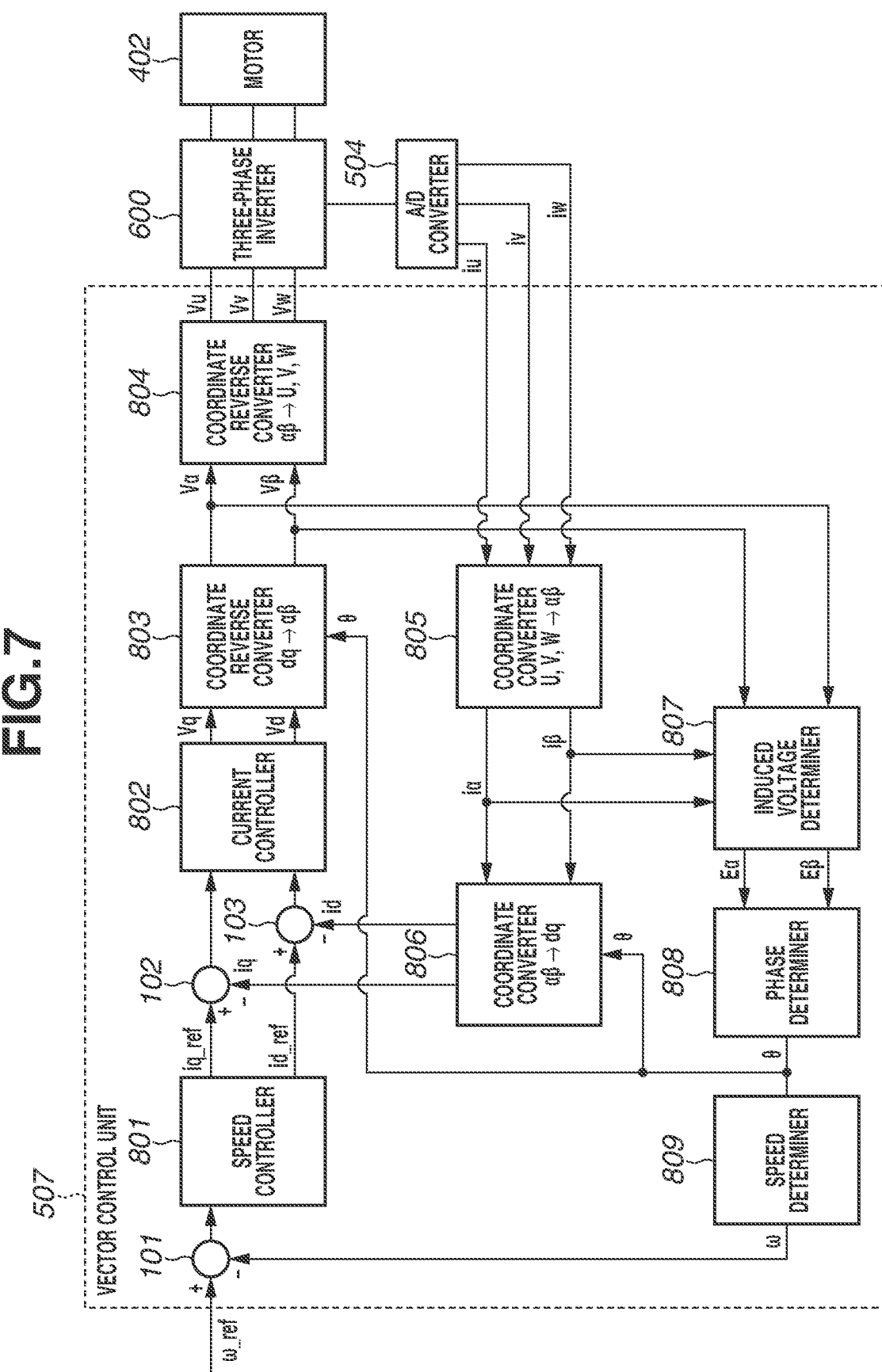
FIG. 7 is a block diagram illustrating a configuration of a vector control unit.

FIG. 7 is a block diagram illustrating an example of a configuration of the vector control unit 507. Furthermore, the vector control unit 507 is configured with at least one ASIC, and performs various functions described below.

The vector control unit 507 includes, as one or more circuits for performing vector control, for example, a speed controller 801, a current controller 802, coordinate reverse converters 803 and 804, and coordinate converters 805 and 806. The coordinate converter 805 converts current vectors corresponding to drive currents flowing through the windings for U phase, V phase, and W phase of the motor 402 into a coordinate system at rest expressed by the α-axis and the β-axis by Clarke conversion. The coordinate converter 806 performs coordinate conversion for converting current values converted into a coordinate system at rest expressed by the α-axis and the β-axis by the coordinate converter 805 into a rotating coordinate system expressed by the q-axis and the d-axis.

As a result, drive currents flowing through the windings are expressed by a current value of the q-axis component (q-axis current) and a current value of the d-axis component (d-axis current), which are current values in the rotating coordinate system. Furthermore, the q-axis current is equivalent to a torque current for causing the rotor 705 of the motor 402 to generate a torque. Moreover, the d-axis current is equivalent to an exciting current affecting the intensity of a magnetic flux penetrating through the windings of the motor 402. The vector control unit 507 is able to control the q-axis current and the d-axis current independently of each other. As a result, the vector control unit 507 is able to cause a torque required for rotation of the rotor 705 to be efficiently generated by controlling the q-axis current according to a load torque applied to the rotor 705. Thus, in vector control, the magnitude of a current vector illustrated in FIG. 6 varies depending on a load torque applied to the rotor 705.

The vector control unit 507 determines a rotational phase θ and a rotational speed ω of the rotor 705 of the motor 402 by a method described below, and performs vector control based on a result of the determination.

As mentioned above, the counter 503 calculates the frequency of a pulse signal output from the CPU 151a. The vector control unit 507 receives, as an input thereto, a value corresponding to the frequency of a pulse signal counted by the counter 503, i.e., a command speed ω_ref representing a target speed of the rotor 705.

A subtractor 101 calculates a deviation Δω between the rotational speed w of the rotor 705 of the motor 402 and the command speed ω_ref and outputs the calculated deviation Δω.

The speed controller 801 acquires the deviation Δω with a period T (for example, 200 microseconds (μs)). The speed controller 801 generates and outputs a q-axis current command value iq_ref and a d-axis current command value id_ref in such a manner that a deviation output from the subtractor 101 becomes smaller based on proportional control (P), integral control (I), and differential control (D). Specifically, the speed controller 801 generates and outputs the q-axis current command value iq_ref and the d-axis current command value id_ref in such a manner that a deviation output from the subtractor 101 becomes 0 based on P control, I control, and D control. Furthermore, the P control is a control method for controlling a value targeted for control based on a value proportional to a deviation between a command value and an estimated value. Moreover, the I control is a control method for controlling a value targeted for control based on a value proportional to a time integration of a deviation between a command value and an estimated value. Moreover, the D control is a control method for controlling a value targeted for control based on a value proportional to a time variation of a deviation between a command value and an estimated value. While the speed controller 801 in the first exemplary embodiment generates the q-axis current command value iq_ref and the d-axis current command value id_ref based on PID control, the first exemplary embodiment is not limited to this. For example, the speed controller 801 can be configured to generate the q-axis current command value iq_ref and the d-axis current command value id_ref based on PI control. Furthermore, while, in a case where a permanent magnet is used for the rotor, usually, the d-axis current command value id_ref, which affects the intensity of a magnetic flux penetrating through the windings, is set to 0, the first exemplary embodiment is not limited to this.

Drive currents flowing through the windings for U phase, V phase, and W phase of the motor 402 are converted by the A/D converter 504 from analog signals into digital signals. Furthermore, the period with which the A/D converter 504 performs sampling of the currents is, for example, a period (for example, 25 μs) smaller than or equal to the period T, with which the speed controller 801 acquires the deviation Δω.

Current values iu, iv, and iw of the drive currents converted from analog signals into digital signals by the A/D converter 504 are input to the coordinate converter 805.

The coordinate converter 805 converts the input current values iu, iv, and iw into current values iα and iβ in the coordinate system at rest by the following formulae (1), (2), and (3):

$$i\alpha = iu - \frac{1}{2}iv - \frac{1}{2}iw \quad (1)$$

$$i\beta = \frac{\sqrt{3}}{2}iv - \frac{\sqrt{3}}{2}iw \quad (2)$$

$$iu + iv + iw = 0 \quad (3)$$

Furthermore, the current values iα and iβ in the coordinate system at rest are expressed as in the following formulae (4) and (5) by the magnitude I of a current vector corresponding to drive currents flowing through the windings for U phase, V phase, and W phase and the phase θe of the current vector. Furthermore, the phase θe of the current vector is defined as an angle between the α-axis and the current vector.

$$i\alpha = I^*\cos(\theta e) \quad (4)$$

$$i\beta = I^*\sin(\theta e) \quad (5)$$

These current values iα and iβ are input to the coordinate converter 806 and an induced voltage determiner 807.

The coordinate converter 806 converts the current values iα and iβ in the coordinate system at rest into a current value iq of the q-axis current and a current value id of the d-axis current in the rotating coordinate system by the following formulae (6) and (7):

$$id = i\alpha^*\cos\theta + i\beta^*\sin\theta \quad (6)$$

$$iq = -i\alpha^*\sin\theta + i\beta^*\cos\theta \quad (7)$$

A subtractor 102 receives, as inputs thereto, the q-axis current command value iq_ref output from the speed controller 801 and the current value iq output from the coordinate converter 806. The subtractor 102 calculates a deviation between the q-axis current command value iq_ref and the current value iq, and outputs the calculated deviation to the current controller 802.

Moreover, a subtractor 103 receives, as inputs thereto, the d-axis current command value id_ref output from the speed controller 801 and the current value id output from the coordinate converter 806. The subtractor 103 calculates a deviation between the d-axis current command value id_ref and the current value id, and outputs the calculated deviation to the current controller 802.

The current controller 802 generates a drive voltage Vq in such a manner that the deviation output from the subtractor 102 becomes small based on PID control. Specifically, the current controller 802 generates the drive voltage Vq in such a manner that the deviation output from the subtractor 102 becomes 0, and outputs the drive voltage Vq to the coordinate reverse converter 803.

Moreover, the current controller 802 generates a drive voltage Vd in such a manner that the deviation output from the subtractor 103 becomes small based on PID control. Specifically, the current controller 802 generates the drive voltage Vd in such a manner that the deviation output from the subtractor 103 becomes 0, and outputs the drive voltage Vd to the coordinate reverse converter 803.

Furthermore, while the current controller 802 in the first exemplary embodiment generates the drive voltages Vq and Vd based on PID control, the first exemplary embodiment is not limited to this. For example, the current controller 802 can be configured to generate the drive voltages Vq and Vd based on PI control.

The coordinate reverse converter 803 performs reverse conversion of the drive voltages Vq and Vd in the rotating coordinate system output from the current controller 802 into drive voltages Vα and Vβ by the following formulae (8) and (9):

$$V\alpha = Vd^*\cos\theta - Vq^*\sin\theta \quad (8)$$

$$V\beta = Vd^*\sin\theta + Vq^*\cos\theta \quad (9)$$

The coordinate reverse converter 803 outputs the drive voltages Vα and Vβ obtained by reverse conversion to the induced voltage determiner 807 and the coordinate reverse converter 804.

The coordinate reverse converter 804 converts the input drive voltages Vα and Vβ into a U-phase drive voltage Vu, a V-phase drive voltage Vv, and a W-phase drive voltage Vw by the following formulae (10), (11), and (12):

$$Vu = \frac{2}{3}i\alpha \quad (10)$$

$$Vv = -\frac{1}{3}i\alpha + \frac{1}{\sqrt{3}}i\beta \quad (11)$$

$$Vw = -\frac{1}{3}i\alpha - \frac{1}{\sqrt{3}}i\beta \quad (12)$$

The coordinate reverse converter 804 outputs the drive voltages Vu, Vv, and Vw obtained by conversion to the three-phase inverter 600.

The three-phase inverter 600 is driven by a PWM signal that is based on the drive voltages Vu, Vv, and Vw input from the coordinate reverse converter 804. As a result, the three-phase inverter 600 generates drive currents iu, iv, and iw corresponding to the drive voltages Vu, Vv, and Vw, and supplies the drive currents iu, iv, and iw to the windings for respective phases of the motor 402, thus driving the motor 402.

Next, a configuration for determining the rotational phase θ is described. To determine the rotational phase θ of the rotor 705, values Eα and Eβ corresponding to inductive voltages induced in the windings for U phase, V phase, and W phase of the motor 402 by the rotation of the rotor 705 are used. The values Eα and Eβ are values of induced voltages respectively corresponding to the α-axis and the β-axis. The values of induced voltages are determined (calculated) by the induced voltage determiner 807. Specifically, the induced voltages Eα and Eβ are determined by the following formulae (13) and (14) from the current values iα and iβ output from the coordinate converter 805 and the drive voltages Vα and Vβ output from the coordinate reverse converter 803:

$$E\alpha = V\alpha - R*i\alpha - L*\frac{di\alpha}{dt} \quad (13)$$

$$E\beta = V\beta - R*i\beta - L*\frac{di\beta}{dt} \quad (14)$$

Here, R denotes a winding resistance, and L denotes a winding inductance.

Values of the winding resistance R and the winding inductance L are values specific to the motor 402 in use, and are previously stored in, for example, the ROM 151b or a memory (not illustrated) provided in the motor control device 157.

The induced voltages Eα and Eβ determined by the induced voltage determiner 807 are output to a phase determiner 808.

The phase determiner 808 determines the rotational phase θ of the rotor 705 of the motor 402 by the following formula (15) based on a ratio between the induced voltage Eα and the induced voltage Eβ output from the induced voltage determiner 807:

$$\theta = \tan^{-1}\left(\frac{E\beta}{E\alpha}\right) \quad (15)$$

Furthermore, while, in the first exemplary embodiment, the phase determiner 808 determines the rotational phase θ by performing a calculation based on formula (15), the first exemplary embodiment is not limited to this. For example, the phase determiner 808 can be configured to determine the rotational phase θ by referring to a table indicating a relationship between values of the induced voltage Eα and induced voltage Eβ and values of the rotational phase θ corresponding to the respective values of the induced voltage Eα and induced voltage Eβ.

The rotational phase θ obtained in the above-mentioned way is input to a speed determiner 809, the coordinate reverse converter 803, and the coordinate converter 806.

The speed determiner 809 determines a rotational speed ω based on a temporal change of the rotational phase θ output from the phase determiner 808. The following formula (16) is used for determining the rotational speed ω:

$$\omega = \frac{d\theta}{dt} \quad (16)$$

The rotational speed ω obtained in the above-mentioned way is input to the subtractor 101.

The vector control unit 507 repeatedly performs the above-described control to perform vector control.

In the above-described way, the vector control unit 507 in the first exemplary embodiment performs vector control using speed feedback control for controlling current values in the rotating coordinate system in such a manner that a deviation between the command speed ω_ref and the rotational speed ω becomes small. Performing the vector control enables preventing or reducing the motor from losing steps, the motor noise from increasing due to surplus torque, and the power consumption from increasing.

Furthermore, while, in the first exemplary embodiment, the rotational phase θ and the rotational speed ω are determined based on formulae (13) to (16), the first exemplary embodiment is not limited to this. Thus, the rotational phase θ and the rotational speed ω only need to be determined by a known method.

[Drive Sequence of Motor]

Next, a drive sequence of the motor 402 in the first exemplary embodiment is described. In the first exemplary embodiment, applying the following configuration enables shortening an FPOT while reducing power consumption in the image forming apparatus. Furthermore, in the following context, the motor 402 drives the pickup roller 19.

Figure 8:
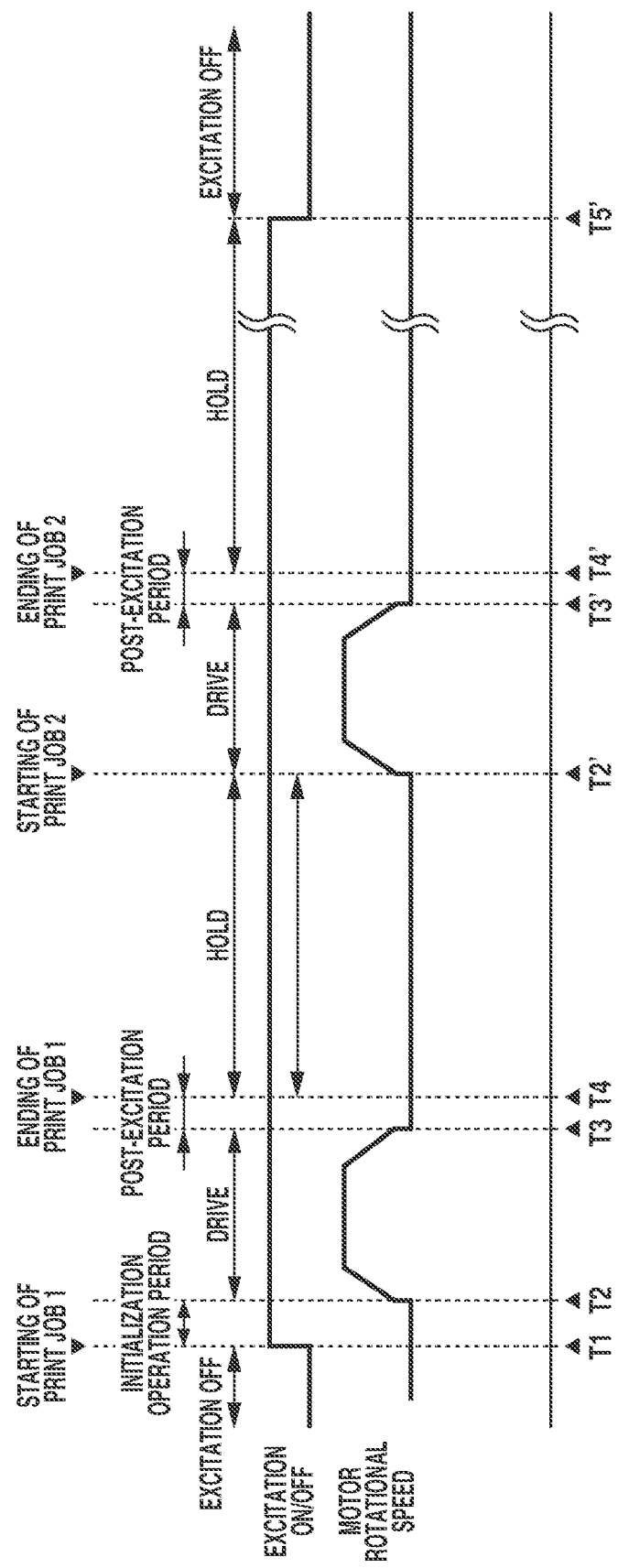
FIG. 8 is a diagram illustrating a drive sequence of the motor.

FIG. 8 is a diagram illustrating the drive sequence of the motor 402. In the following description, the drive sequence of the motor 402 is described with reference to FIG. 8.

As illustrated in FIG. 8, when, at time point T1, an instruction for starting a print job 1 is issued from an external apparatus, such as a personal computer (PC), or the operation unit 152 to the CPU 151a, the CPU 151a controls the motor control device 157 in such a way as to start driving of the motor 402. As a result, the motor control device 157 starts an operation for detecting the stop position of the rotor 705 of the motor 402 (initialization operation).

When, at time point T2, detection of the stop position of the rotor 705 of the motor 402 is completed, the motor control device 157 performs driving of the motor 402 by synchronous control, and then performs vector control. Specifically, the motor control device 157 performs driving of the motor 402 by synchronous control in such a manner that the rotor 705 rotates in a direction corresponding to the rotational direction of the pickup roller 19 at the time of the pickup roller 19 feeding a recording medium, and then performs vector control. Then, the motor 402 is driven at a predetermined rotational speed.

After that, when, at time point T3, driving of the motor 402 ends based on an image forming sequence, the motor control device 157 holds the rotor 705 of the motor 402 for a predetermined time Ta (post-excitation) at the position where the rotor 705 has stopped. Specifically, the motor control device 157 maintains excitation of windings for phases corresponding to the position where the rotor 705 of the motor 402 has stopped. Furthermore, the predetermined time Ta is a time from time point T3 to time point T4 illustrated in FIG. 8, and is set to a time longer than a time required for vibration of the rotor 705 of the motor 402 to end. The vibration of the rotor 705 of the motor 402 ends by post-excitation.

In the first exemplary embodiment, the motor control device 157 holds the rotor 705 of the motor 402 at a desired phase by maintaining excitation of windings of the motor 402 for a period until a predetermined time Td elapses from time point T4. Furthermore, an excitation phase in holding the rotor 705 is the same as, for example, an excitation phase in a post-excitation period.

In a case where, even when the predetermined time Td has elapsed from time point T4, an instruction for starting a new print job is not issued, the motor control device 157 turns off excitation of the windings of the motor 402. On the other hand, when, at time point T2', being notified from the CPU 151a that an instruction for starting a print job 2 has been issued in a period until the predetermined time Td elapses from time point T4, the motor control device 157 starts driving of the motor 402 without performing an operation of detecting the stop position of the rotor 705 of the motor 402.

Thus, the motor 402 is driven by synchronous control, and, then, vector control is performed. Then, the motor 402 is driven at the predetermined rotational speed. Furthermore, in the first exemplary embodiment, if a state in which an instruction for starting a new print job is not issued continues for a predetermined time Te from time point T4, the electric power mode of the image forming apparatus 100 switches from the normal power mode to the sleep mode. The predetermined time Te is a time longer than or equal to the predetermined time Td.

After that, when, at time point T3', driving of the motor 402 ends based on the image forming sequence, the motor control device 157 performs post-excitation. When, at time T5', a state in which an instruction for starting a new print job is not issued has continued for the predetermined time Td from time point T4', the motor control device 157 turns off excitation of the windings of the motor 402. Furthermore, a time from time point T3' to time point T4' is equivalent to the predetermined time Ta.

Figure 9:
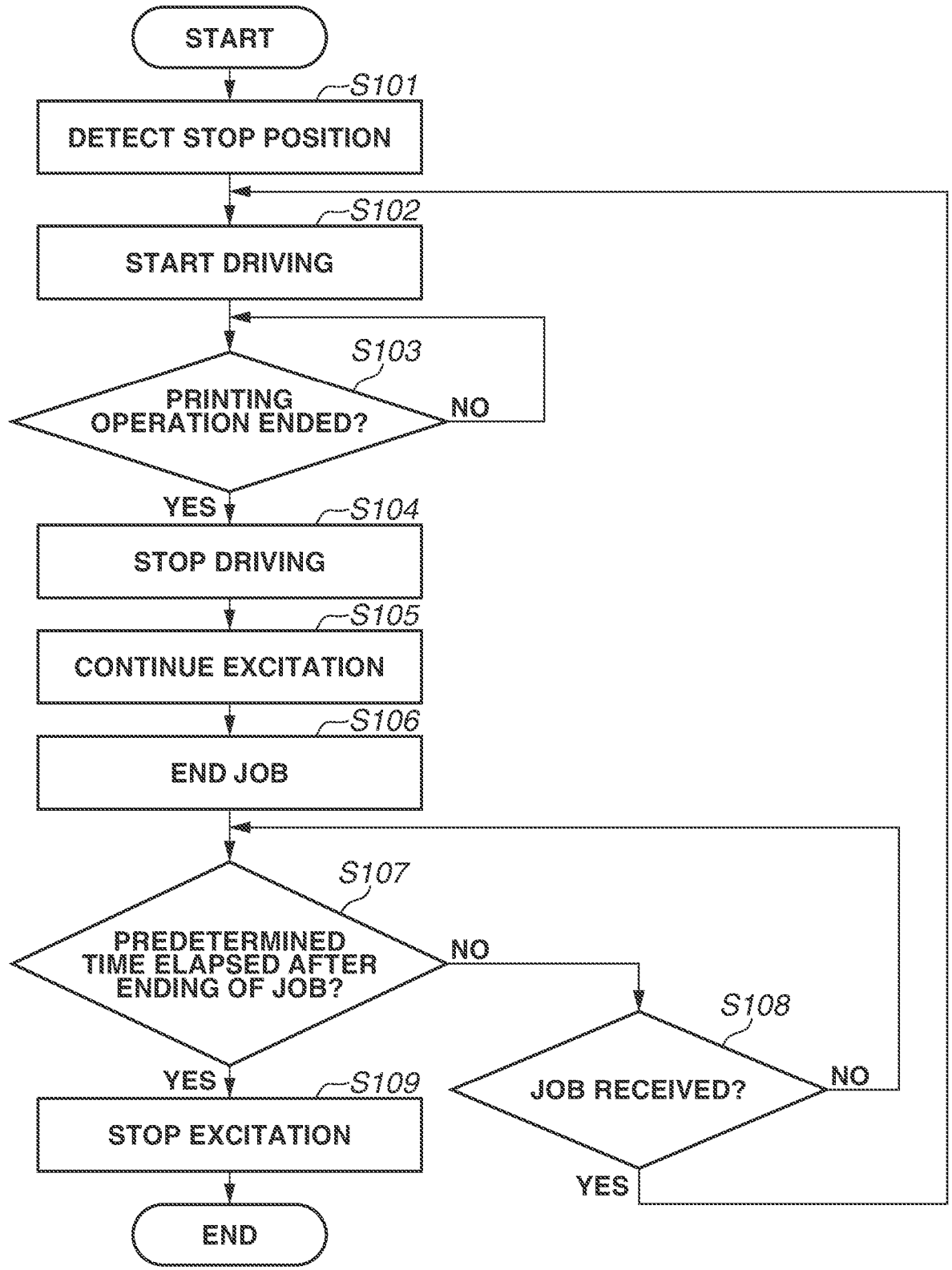
FIG. 9 is a flowchart illustrating control of the motor which is performed by a central processing unit (CPU) in the first exemplary embodiment.

FIG. 9 is a flowchart illustrating control of the motors 402 and 403, which is performed by the CPU 151a. If an instruction for starting a print job is issued from the operation unit 152 or an external apparatus such as a PC, the CPU 151a, which serves as a reception unit, starts processing in the present flowchart.

In step S101, the CPU 151a controls the motor control device 157 in such a way as to detect the stop position of the motor 402 being at a stop. As a result, detection of the stop position of the rotor 705 of the motor 402 by the motor control device 157 (initial operation) is performed.

Then, in step S102, the CPU 151a controls the motor control device 157 in such a way as to start driving of the motor 402. As a result, driving of the motor 402 by the motor control device 157 is started.

Next, when, in step S103, a print (printing) operation ends (YES in step S103), then in step S104, the CPU 151a controls the motor control device 157 in such a way as to stop driving of the motor 402. As a result, rotation of the motor 402 is stopped.

Next, in step S105, the CPU 151a controls the motor control device 157 in such a way as to maintain excitation of the motor 402. As a result, the rotor 705 of the motor 402 enters into a state of being held at a desired position.

After, in step S106, the print job ends, if, in step S107, the predetermined time Td has not yet elapsed from ending of the print job (NO in step S107), the CPU 151a advances the processing to step 5108.

If, in step S108, an instruction for starting a new print job is not yet received (NO in step S108), the CPU 151a returns the processing to step S107.

On the other hand, if, in step S108, an instruction for starting a new print job has been received (YES in step S108), the CPU 151a returns the processing to step S102.

Moreover, if, in step S107, the predetermined time Td has elapsed from ending of the print job (YES in step S107), then in step S109, the CPU 151a controls the motor control device 157 in such a way as to stop excitation of the motor 402. As a result, excitation of the windings of the motor 402 is stopped.

As described above, in the first exemplary embodiment, the motor control device 157, which controls the motor 402 for driving the pickup roller 19, maintains excitation of the windings of the motor 402 for a period until the predetermined time Td elapses from when the print job 1 ends and post-excitation is performed. As a result, the rotor 705 of the motor 402 is held at a desired phase. Moreover, in a case where an instruction for starting a new print job is not issued even if the predetermined time Td elapses from when post-excitation is performed, the motor control device 157 turns off excitation of the windings of the motor 402. In this way, in the first exemplary embodiment, in the second print job 2, excitation of the windings of the motor 402 for driving the pickup roller 19, which is a conveyance roller located on the most upstream side out of the conveyance rollers for conveying a recording medium, is maintained for a period until a predetermined time elapses from ending of the print job 1. As a result, when an instruction for starting the print job 2 is issued, the motor control device 157 is able to start driving of the motor 402 without performing an operation for detecting the stop position of the rotor 705 of the motor 402. Thus, an FPOT in the print job 2 is shortened. Moreover, the motor control device 157 is able to reduce power consumption as compared with a case where the rotor 705 is always held for a period from when the print job 1 ends to when an instruction for starting the print job 2 is issued. Thus, according to the configuration of the first exemplary embodiment, it is possible to provide an image forming apparatus capable of shortening an FPOT while reducing power consumption in the image forming apparatus.

Furthermore, when an instruction for performing the print job 2 is input during execution of the print job 1, the CPU 151a controls the motor control device 157 in such a way as to maintain excitation of the windings of the motor 402 after the print job 1 ends and post-excitation is performed. As a result, after ending of the print job 1, the CPU 151a is able to immediately start the print job 2 without performing an operation for detecting the stop position of the rotor 705 of the motor 402. Thus, it is possible to shorten an FPOT.

Furthermore, while, in the first exemplary embodiment, timing at which a printing operation has ended corresponds to timing at which feeding of the final recording medium in a print job (image forming job) by the pickup roller 19 has ended, the first exemplary embodiment is not limited to this. For example, timing at which fixing of an image to the final recording medium in a print job has ended can correspond to timing at which the printing operation has ended, or timing at which transfer of an image to the final recording medium in a print job has ended can correspond to timing at which the printing operation has ended. Moreover, for example, timing at which discharge of the final recording medium in a print job to outside the image forming apparatus has ended can correspond to timing at which the printing operation has ended. The timing at which fixing of an image to the final recording medium in a print job has ended can be determined based on a sensor provided more downstream than the fixing device 29. Moreover, the timing at which transfer of an image to the final recording medium in a print job has ended can be determined based on a sensor provided more downstream than the transfer roller pair 28. Moreover, the timing at which discharge of the final recording medium in a print job to outside the image forming apparatus has ended can be determined based on a sensor provided more downstream than the discharge roller 30.

In a second exemplary embodiment, portions different in the configuration of the image forming apparatus 100 from those in the first exemplary embodiment are omitted from description.

[Drive Sequence of Motor]

Next, a drive sequence of the motor 402 in the second exemplary embodiment is described. The second exemplary embodiment is directed to providing an image forming apparatus capable of shortening an FPOT while reducing power consumption in the image forming apparatus. Furthermore, in the following context, the motor 402 drives the pickup roller 19.

In the second exemplary embodiment, during a period in which the operation unit 152 is being operated, for example, setting data in the operation unit 152 is transmitted from the operation unit 152 to the CPU 151a at a predetermined time interval.

In the second exemplary embodiment, for a period until the predetermined time Td elapses from time point T4, the motor control device 157 holds the rotor 705 of the motor 402 at a desired phase by maintaining excitation of the windings of the motor 402. Additionally, when being notified from operation unit 152 that the operation unit 152 is being operated during a period in which excitation of the windings of the motor 402 is maintained, the motor control device 157 maintains excitation of the windings of the motor 402 for a period until the predetermined time Td elapses from the time of the notification. Thus, in the second exemplary embodiment, when being notified from the operation unit 152 that the operation unit 152 is being operated during a period in which excitation of the windings of the motor 402 is maintained, the motor control device 157 maintains excitation of the windings of the motor 402 for a period longer than the predetermined time Td. In this way, in the second exemplary embodiment, in a case where there is a possibility of an instruction for starting the print job 2 being issued, the motor control device 157 prolongs a period in which to maintain excitation of the windings of the motor 402. As a result, in response to an instruction for starting the print job 2 being issued, the motor control device 157 is able to start driving of the motor 402 without performing an operation for detecting the stop position of the rotor 705 of the motor 402. Thus, an FPOT in the print job 2 is shortened. Moreover, the motor control device 157 is able to reduce power consumption as compared with a case where the rotor 705 is always held for a period from when the print job 1 ends to when an instruction for starting the print job 2 is issued. Thus, according to the configuration of the second exemplary embodiment, it is possible to provide an image forming apparatus capable of shortening an FPOT while reducing power consumption in the image forming apparatus.

Figure 10:
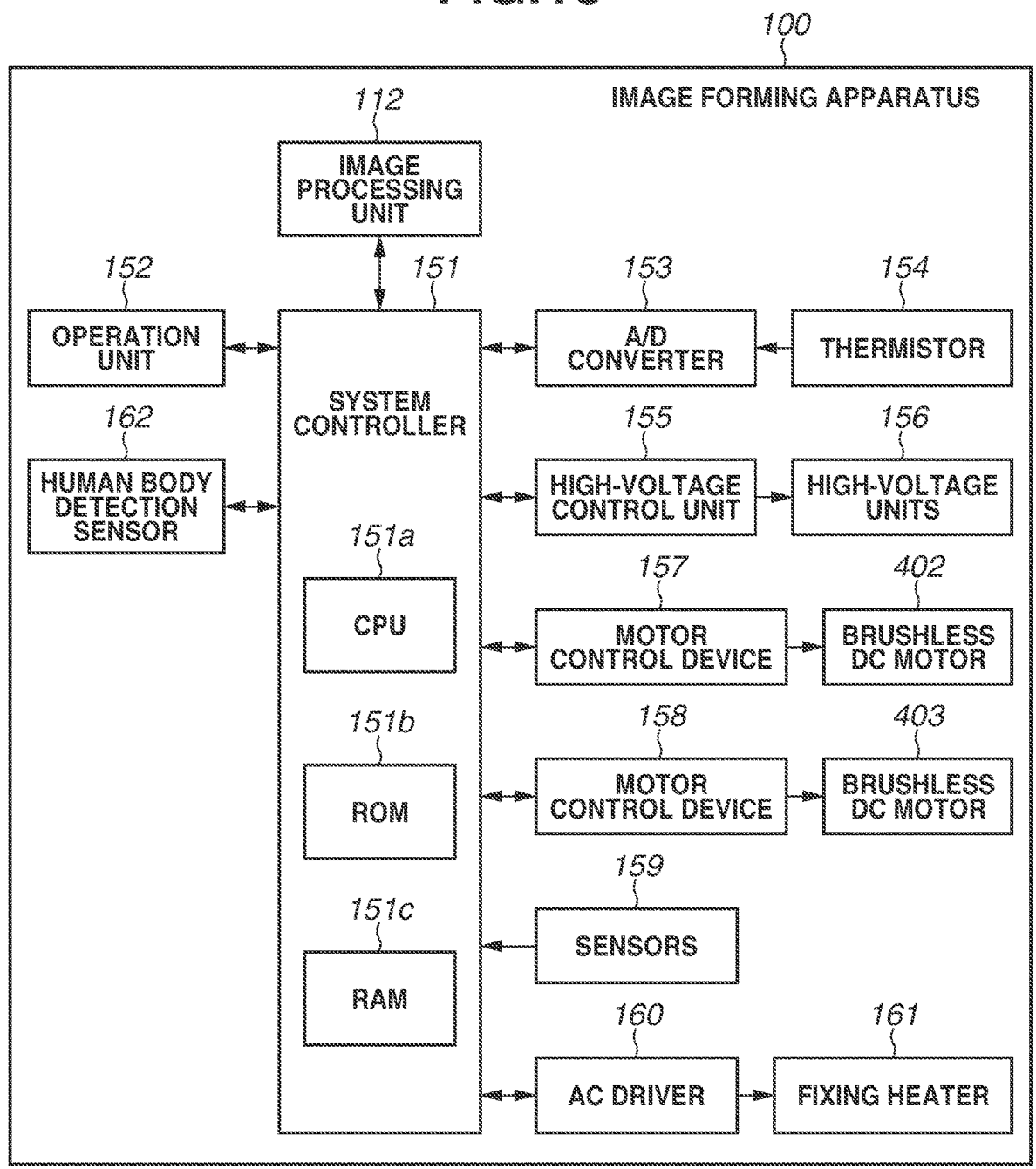
FIG. 10 is a block diagram illustrating an example of a control configuration of an image forming apparatus in a third exemplary embodiment.

In a third exemplary embodiment, portions different in the configuration of the image forming apparatus 100 from those in the first exemplary embodiment are omitted from description. FIG. 10 is a block diagram illustrating an example of a control configuration of the image forming apparatus 100 according to the third exemplary embodiment. The image forming apparatus 100 in the third exemplary embodiment is provided with a human body detection sensor 162. The human body detection sensor 162 is a sensor in which infrared sensors for receiving infrared light are arrayed in a matrix form, and detects a human body by receiving infrared light radiated from the human body. The human body detection sensor (human detecting sensor) 162 transmits a detection result to the CPU 151a.

Figure 11A:
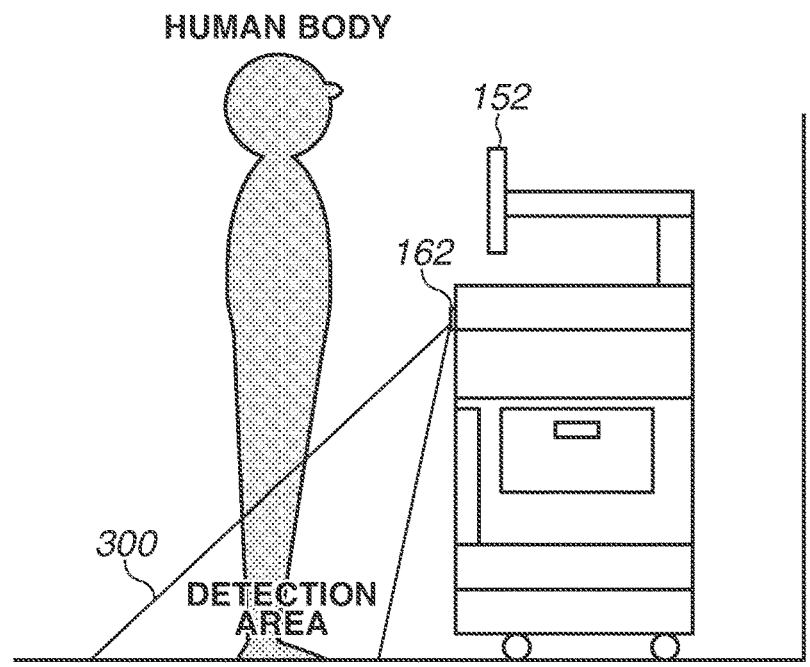
FIGS. 11A and 11B are diagrams used to explain a detection area set for a human body detection sensor.
Figure 11B:
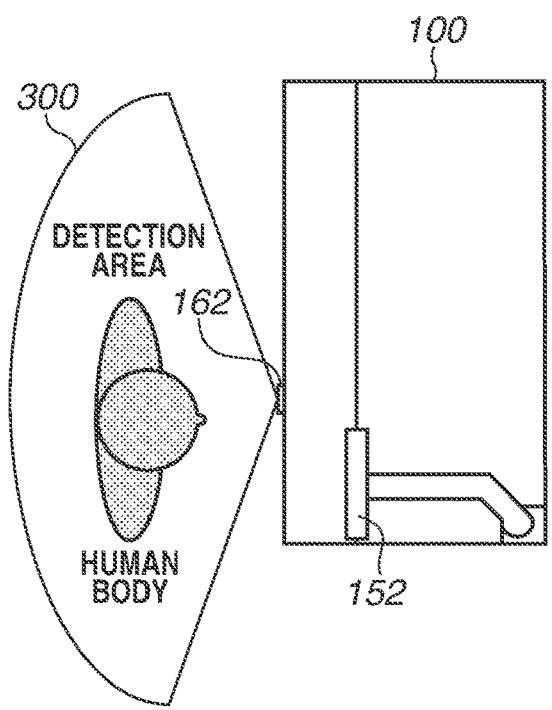

FIGS. 11A and 11B are diagrams used to explain a detection area set for the human body detection sensor 162. The human body detection sensor 162 detects whether a human body is present in the detection area 300.

[Drive Sequence of Motor]

Next, a drive sequence of the motor 402 in the third exemplary embodiment is described. In the third exemplary embodiment, applying the following configuration enables providing an image forming apparatus capable of shortening an FPOT while reducing power consumption in the image forming apparatus. Furthermore, in the following context, the motor 402 drives the pickup roller 19.

In the third exemplary embodiment, for a period until the predetermined time Td elapses from time point T4, the motor control device 157 holds the rotor 705 of the motor 402 at a desired phase by maintaining excitation of the windings of the motor 402. Additionally, in response to the human body detection sensor 162 detecting a human body as an object in a period in which excitation of the windings of the motor 402 is maintained, the motor control device 157 maintains excitation of the windings of the motor 402 for a period until the predetermined time Td elapses from the time of the detection. Thus, in the third exemplary embodiment, in response to the human body detection sensor 162 detecting a human body as an object in a period in which excitation of the windings of the motor 402 is maintained, the motor control device 157 maintains excitation of the windings of the motor 402 for a period longer than the predetermined time Td. In this way, in the third exemplary embodiment, in a case where there is a possibility of an instruction for starting the print job 2 being issued, the motor control device 157 maintains excitation of the windings of the motor 402. As a result, in response to an instruction for starting the print job 2 being issued, the motor control device 157 is able to start driving of the motor 402 without performing an operation for detecting the stop position of the rotor 705 of the motor 402. Thus, an FPOT in the print job 2 is shortened. Moreover, the motor control device 157 is able to reduce power consumption as compared with a case where the rotor 705 is always held for a period from when the print job 1 ends to when an instruction for starting the print job 2 is issued. Thus, according to the configuration of the third exemplary embodiment, it is possible to provide an image forming apparatus capable of shortening an FPOT while reducing power consumption in the image forming apparatus.

Furthermore, while, in the first exemplary embodiment to the third exemplary embodiment, a case where the motor 402 drives the pickup roller 19 has been described, such exemplary embodiments are not limited to this case. For example, the configuration of the third exemplary embodiment can be applied to a motor for driving a conveyance roller other than the pickup roller 19.

Moreover, while, in the first exemplary embodiment to the third exemplary embodiment, a configuration in which the motor 402 drives the pickup roller 19 is employed, for example, a configuration in which the motor 402 drives both the pickup roller 19 and the conveyance roller 39 can be employed. Thus, a configuration in which the motor 402 drives a plurality of conveyance rollers including the pickup roller 19 can be employed.

Moreover, while, in the first exemplary embodiment to the third exemplary embodiment, a configuration in which the motor 402 drives the pickup roller 19 has been described, for example, a configuration in which the motor 402 drives the pickup roller 43 can be employed.

In a fourth exemplary embodiment, portions different in the configuration of the image forming apparatus 100 from those in the first exemplary embodiment are omitted from description.

[Drive Sequences of Motors]

Next, drive sequences of the motors 402 and 403 in the fourth exemplary embodiment are described. In the fourth exemplary embodiment, applying the following configuration enables providing an image forming apparatus capable of shortening an FPOT while reducing power consumption in the image forming apparatus. Furthermore, in the following context, the motor 402 drives the pickup roller 19 and the motor 403 drives the discharge roller 30.

FIG. 12 is a diagram illustrating drive sequences of the motor 402 and the motor 403. In the following description, the drive sequences of the motor 402 and the motor 403 are described with reference to FIG. 12.

As illustrated in FIG. 12, when, at time point T1, an instruction for starting a print job 1 is issued from, for example, the operation unit 152 or an external apparatus such as a PC, excitation of the windings of the rotor 705 of the motor 402 is started, and an operation for detecting the stop position of the rotor 705 of the motor 402 (initialization) is performed.

When, at time point T2, detection of the stop position of the rotor 705 of the motor 402 is completed, the motor 402 is driven by synchronous control, and, then, vector control is performed. Specifically, the motor control device 157 performs driving of the motor 402 by synchronous control in such a manner that the rotor 705 rotates in a direction corresponding to the rotational direction of the pickup roller 19 at the time of the pickup roller 19 feeding a recording medium, and then performs vector control. Then, the motor 402 is driven at a predetermined rotational speed.

After that, when, at time point T5, driving of the motor 402 ends based on an image forming sequence, the motor control device 157 holds the rotor 705 of the motor 402 at a position where the rotor 705 has stopped. Specifically, the motor control device 157 maintains excitation of windings for phases corresponding to the position where the rotor 705 of the motor 402 has stopped.

As illustrated in FIG. 12, when, at time point T3, a predetermined time Ts has elapsed from time point T1, excitation of the windings of the motor 403 is started, and an operation for detecting the stop position of the rotor of the motor 403 (initialization) is performed.

When, at time point T4, detection of the stop position of the rotor of the motor 403 is completed, the motor 403 is driven by synchronous control, and, then, vector control is performed. Specifically, the motor control device 158 performs driving of the motor 403 by synchronous control in such a manner that the rotor rotates in a direction corresponding to the rotational direction of the discharge roller 30 at the time of the discharge roller 30 discharging a recording medium, and then performs vector control. Then, the motor 403 is driven at a predetermined rotational speed.

After that, when, at time T6, driving of the motor 403 ends based on the image forming sequence, the motor control device 158 turns off excitation of the windings of the motor 403. As a result, supplying of currents to the windings of the motor 403 is stopped.

As illustrated in FIG. 12, in the fourth exemplary embodiment, when, at time point T7, the print job 1 has ended, while excitation of the windings of the motor 403 is turned off, excitation of the windings of the motor 402 is in an on-state. In the fourth exemplary embodiment, during a period until the predetermined time Td elapses from the time of ending of the print job 1, the motor control device 157 maintains excitation of the windings of the motor 402 to hold the rotor 705 of the motor 402 at a desired phase. In a case where an instruction for starting a new print job is not issued even if the predetermined time Td has elapsed after ending of the print job 1, the motor control device 157 turns off excitation of the windings of the motor 402.

When, at time T2', an instruction for starting a print job 2 is issued from, for example, the operation unit 152 or an external apparatus such as a PC within a period until the predetermined time Td elapses after ending of the print job 1, the motor control device 157 starts driving of the motor 402 without performing an operation for detecting the sop position of the rotor 705 of the motor 402. Thus, the motor 402 is driven by synchronous control, and, then, vector control is performed. Then, the motor 402 is driven at the predetermined rotational speed.

After that, when, at time point T5', driving of the motor 402 ends based on the image forming sequence, the motor control device 157 holds the rotor 705 of the motor 402 at a position where the rotor 705 has stopped. Specifically, the motor control device 157 maintains excitation of the windings in phases corresponding to the position where the rotor 705 of the motor 402 has stopped. When, at time point T8', a state in which an instruction for starting a new print job is not issued has continued for the predetermined time Td after ending of the print job 2, the motor control device 157 turns off excitation of the windings of the motor 402.

As illustrated in FIG. 12, at time point T3', excitation of the windings of the motor 403 is started, and an operation for detecting the stop position of the rotor of the motor 403 (initialization) is performed.

When, at time point T4', detection of the stop position of the rotor of the motor 403 is completed, the motor 403 is driven by synchronous control, and vector control is performed. Then, the motor 403 is driven at the predetermined rotational speed.

After that, when, at time T6', driving of the motor 403 ends based on the image forming sequence, the motor control device 158 turns off excitation of the windings of the motor 403. As a result, supplying of currents to the windings of the motor 403 is stopped.

Figure 13:
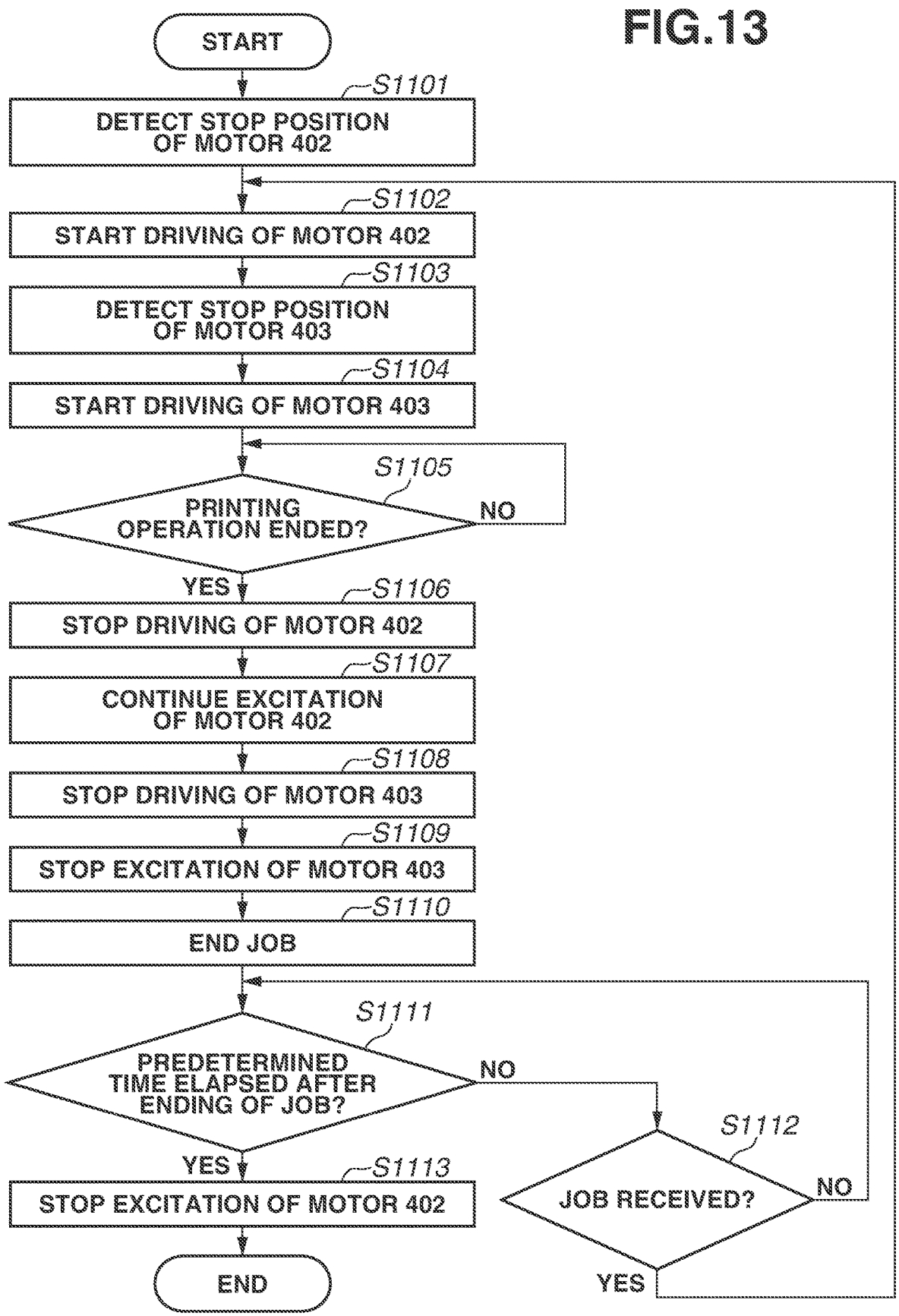
FIG. 13 is a flowchart illustrating control of the motors which is performed by a CPU in a fourth exemplary embodiment.

FIG. 13 is a flowchart illustrating control of the motors 402 and 403, which is performed by the CPU 151a. If an instruction for starting a print job is issued from the operation unit 152 or an external apparatus such as a PC, the CPU 151a starts processing in the present flowchart.

In step S1101, the CPU 151a controls the motor control device 157 in such a way as to detect the stop position of the motor 402. As a result, detection of the stop position of the rotor 705 of the motor 402 by the motor control device 157 is performed.

Then, in step S1102, the CPU 151a controls the motor control device 157 in such a way as to start driving of the motor 402. As a result, driving of the motor 402 by the motor control device 157 is started.

Next, in step S1103, the CPU 151a controls the motor control device 158 in such a way as to detect the stop position of the motor 403. As a result, detection of the stop position of the rotor of the motor 403 by the motor control device 158 is performed.

Then, in step S1104, the CPU 151a controls the motor control device 158 in such a way as to start driving of the motor 403. As a result, driving of the motor 403 by the motor control device 158 is started.

Next, when, in step S1105, a print (printing) operation ends (YES in step S1105), then in step S1106, the CPU 151a controls the motor control device 157 in such a way as to stop driving of the motor 402. As a result, rotation of the motor 402 is stopped.

Next, in step S1107, the CPU 151a controls the motor control device 157 in such a way as to maintain excitation of the motor 402. As a result, the rotor 705 of the motor 402 enters into a state of being held at a desired position.

In step S1108, the CPU 151a controls the motor control device 158 in such a way as to stop driving of the motor 403. As a result, rotation of the motor 403 is stopped.

Next, in step S1109, the CPU 151a controls the motor control device 158 in such a way as to stop excitation of the motor 403. As a result, excitation of the windings of the motor 403 is stopped.

After, in step S1110, the print job ends, if, in step S1111, the predetermined time Td has not yet elapsed from ending of the print job (NO in step S1111), the CPU 151a advances the processing to step S1112.

If, in step S1112, an instruction for starting a new print job is not yet received (NO in step S1112), the CPU 151a returns the processing to step S1111.

On the other hand, if, in step S1112, an instruction for starting a new print job has been received (YES in step S1112), the CPU 151a returns the processing to step S1102.

Moreover, if, in step S1111, the predetermined time Td has elapsed from ending of the print job (YES in step S1111), then in step S1113, the CPU 151a controls the motor control device 157 in such a way as to stop excitation of the motor 402. As a result, excitation of the windings of the motor 402 is stopped.

As described above, in the fourth exemplary embodiment, the motor control device 157, which controls the motor 402 for driving the pickup roller 19, maintains excitation of the windings of the motor 402 for a period until the predetermined time Td elapses from ending of the print job 1. As a result, the rotor 705 of the motor 402 is held at a desired phase. Moreover, in a case where an instruction for starting a new print job is not issued even if the predetermined time Td elapses from ending of the print job 1, the motor control device 157 turns off excitation of the windings of the motor 402. In this way, in the fourth exemplary embodiment, in the second print job 2, excitation of the windings of the motor 402 for driving the pickup roller 19, which is a conveyance roller located on the most upstream side out of the conveyance rollers for conveying a recording medium, is maintained for a period until a predetermined time elapses from ending of the print job 1. As a result, when an instruction for starting the print job 2 is issued, the motor control device 157 is able to start driving of the motor 402 without performing an operation for detecting the stop position of the rotor 705 of the motor 402. Thus, an FPOT in the print job 2 is shortened.

Moreover, when the print job 1 has ended, the motor control device 158, which controls the motor 403 for driving the discharge roller 30, stops excitation of the windings of the motor 403. This is because, since, even if an operation for detecting the stop position of the rotor of the motor 403 is performed after an instruction for starting the print job 2 is issued, it is possible to accelerate the motor 403 to the predetermined rotational speed before a recording medium being conveyed arrives at the discharge roller 30, such an operation does not affect a decrease in FPOT. Such a configuration enables reducing power consumption as compared with a case where excitation of the windings of all of the motors included in the image forming apparatus is maintained after ending of a print job. Furthermore, in the fourth exemplary embodiment, a time required for performing an operation for detecting the stop position of the rotor of the motor 403 from time point T2' illustrated in FIG. 12 and then accelerating the motor 403 to the predetermined rotational speed is shorter than a time required for a recording medium to arrive at the discharge roller 30 from time point T2'.

According to the above-described configuration, it is possible to provide an image forming apparatus capable of shortening an FPOT while reducing power consumption in the image forming apparatus.

Furthermore, while, in the fourth exemplary embodiment, a case where the motor 402 drives the pickup roller 19 and the motor 403 drives the discharge roller 30 has been described, the fourth exemplary embodiment can be applied to other cases. For example, a configuration in which the motor 402 drives at least one of conveyance rollers located more upstream than the transfer roller pair 28 and the motor 403 drives at least one of conveyance rollers located more downstream than the transfer roller pair 28 only needs to be employed. Thus, a configuration in which excitation of the windings of at least one of a plurality of motors which drives conveyance rollers located more upstream than the transfer roller pair 28 is maintained during a period until the predetermined time Td elapses from ending of the print job 1 can be employed. Moreover, a configuration in which excitation of the windings of at least one of a plurality of motors which drives conveyance rollers located more downstream than the transfer roller pair 28 is stopped in response to ending of the print job 1 can be employed. Thus, in the image forming apparatus 100, a motor the excitation of the windings of which is maintained during a period until the predetermined time Td elapses from ending of the print job 1 and a motor the excitation of the windings of which is stopped in response to ending of the print job 1 only need to be provided. Such a configuration enables reducing power consumption as compared with a case where excitation of the windings of all of the motors included in the image forming apparatus is maintained for a uniform time after ending of a print job.

Moreover, while, in the fourth exemplary embodiment, when driving of the motor 403 ends, the motor control device 158 turns off excitation of the windings of the motor 403 (stops supplying of currents to the windings of the motor 403), the fourth exemplary embodiment is not limited to this. For example, when driving of the motor 403 ends, the motor control device 158 can maintain excitation of the windings of the motor 403 for a period shorter than the predetermined time Td. Such a configuration enables reducing power consumption as compared with a case where excitation of the windings of all of the motors included in the image forming apparatus is maintained for a uniform time after ending of a print job.

Moreover, while, in the fourth exemplary embodiment, when the predetermined time Ts has elapsed after an instruction for starting a print job is issued, excitation of the windings of the motor 403 is started, the fourth exemplary embodiment is not limited to this. For example, when an instruction for starting a print job has been issued, excitation of the windings of the motor 403 can be started.

Moreover, while, in the fourth exemplary embodiment, a configuration in which the motor 402 drives the pickup roller 19 is employed, for example, a configuration in which the motor 402 drives both the pickup roller 19 and the conveyance roller 39 can be employed. Thus, the motor 402 can be configured to drive a plurality of conveyance rollers including the pickup roller 19.

Moreover, while, in the fourth exemplary embodiment, a configuration in which the motor 402 drives the pickup roller 19 has been described, for example, a configuration in which the motor 402 drives the pickup roller 43 can be employed.

Moreover, while, in the fourth exemplary embodiment, a configuration in which the motor 402 drives the pickup roller 19 has been described, the fourth exemplary embodiment can be applied to other configurations. For example, the motor 402 only needs to be configured to drive at least one of conveyance rollers provided inside the image forming apparatus 100. Such a configuration enables reducing power consumption as compared with a case where excitation of the windings of all of the motors included in the image forming apparatus is maintained for a uniform time after ending of a print job.

In the first exemplary embodiment to the fourth exemplary embodiment, timing at which a printing operation has ended corresponds to timing at which feeding of the final recording medium in a print job (image forming job) by the pickup roller 19 has ended. The timing at which feeding of the final recording medium in a print job by the pickup roller 19 has ended can be determined based on a sensor provided in the image forming apparatus for detecting a recording medium being conveyed. Specifically, timing at which the front edge of the final recording medium in a print job having passed through a sensor provided between the pickup roller 19 and the conveyance roller 39 has been detected can correspond to timing at which a printing operation has ended.

The timing at which a printing operation has ended is not limited to timing at which feeding of the final recording medium in a print job (image forming job) by the pickup roller 19 has ended. For example, timing at which fixing of an image to the final recording medium in a print job has ended can correspond to timing at which the printing operation has ended, or timing at which transfer of an image to the final recording medium in a print job has ended can correspond to timing at which the printing operation has ended. Moreover, for example, timing at which discharge of the final recording medium in a print job to outside the image forming apparatus has ended can correspond to timing at which the printing operation has ended. The timing at which fixing of an image to the final recording medium in a print job has ended can be determined based on a sensor provided more downstream than the fixing device 29. Moreover, the timing at which transfer of an image to the final recording medium in a print job has ended can be determined based on a sensor provided more downstream than the transfer roller pair 28. Moreover, the timing at which discharge of the final recording medium in a print job to outside the image forming apparatus has ended can be determined based on a sensor provided more downstream than the discharge roller 30.

While, in vector control performed in the first exemplary embodiment to the fourth exemplary embodiment, the motors 402 and 403 are controlled by performing feedback control, such exemplary embodiments are not limited to this. For example, a configuration in which the motors 402 and 403 are controlled by feeding back the rotational phase θ of the rotor of each of the motors 402 and 403 can be employed.

Moreover, while, in the first exemplary embodiment to the fourth exemplary embodiment, a brushless DC motor is used as a motor for driving a load, another type of motor, such as a stepping motor or a DC motor, can also be used. Moreover, the number of phases of windings included in the motor is not limited to three (U phase, V phase, and W phase), but can be a number other than three.

Moreover, in the first exemplary embodiment to the fourth exemplary embodiment, the functions of the motor control device 157 can be included in the CPU 151a.

Moreover, while, in the first exemplary embodiment to the fourth exemplary embodiment, an operation for detecting the stop position of the motor is performed as an initialization operation, such exemplary embodiments are not limited to this. For example, as an initialization operation, an operation for exciting a predetermined phase of the motor to draw the rotor into the predetermined phase can be performed.

The phase at which the motor 402 is held can be the same as or different from the phase at which the motor 403 is held.

For example, a photosensitive drum, a charging device, developing device, a transfer roller, and a transfer belt are included in an image forming unit.

According to aspects of the present disclosure, it is possible to provide an image forming apparatus capable of shortening an FPOT while reducing power consumption in the image forming apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-020826, filed Feb. 12, 2021, and No. 2021-202663, filed Dec. 14, 2021, which are hereby incorporated by reference herein in their entirety.

What is claimed is:

1. An image forming apparatus comprising:
 a stacking portion on which a recording medium is to be stacked;
 a pickup roller configured to feed the recording medium stacked on the stacking portion;
 a first motor configured to drive the pickup roller;
 an image forming unit configured to form an image on the recording medium fed by the pickup roller; and
 a controller configured to perform operations including:
  receiving an instruction for starting an image forming job for forming the image on the recording medium,
  performing a first initial operation upon receiving an instruction for starting a first job serving as the image forming job, wherein, in the first initial operation, the controller supplies current to a winding of the first motor in a first stop state in which a rotor of the first motor is at a stop and determines a phase of the rotor having been in the first stop state based on the current flowing through the winding of the first motor, and
  controlling current to be supplied to the winding in such a manner that the rotor having been in the first stop state rotates, based on the phase determined by the first initial operation,
 wherein, in a case where the first job ends, the controller controls the current to be supplied to the winding in such a manner that the rotor is held at a first phase,
 wherein, upon receiving an instruction for starting a second job serving as the image forming job within a first period until a first predetermined time elapses from when the rotor is held at the first phase due to the ending of the first job, the controller controls the current to be supplied to the winding in such a manner that the rotor having being held rotates without performing the first initial operation, and wherein, upon not receiving the instruction for starting the second job within the first period, the controller stops supplying the current to the winding.

2. The image forming apparatus according to claim 1, further comprising:
a conveyance roller provided downstream of the pickup roller in a conveyance direction in which the recording medium is conveyed, and configured to convey the recording medium fed by the pickup roller; and
a second motor configured to drive the conveyance roller,
wherein the controller performs a second initial operation upon receiving the instruction for starting the first job, in the second initial operation, the controller supplying current to a winding of the second motor in a second stop state in which a rotor of the second motor is at a stop and determining a phase of the rotor of the second motor having been in the second stop state based on the current flowing through the winding of the second motor,
wherein the controller controls the current to be supplied to the winding of the second motor in such a manner that the rotor of the second motor having been in the second stop state rotates, based on the phase determined by the second initial operation,
wherein, upon stopping rotation of the rotor of the second motor, the controller stops supplying the current to the winding of the second motor, and
wherein, upon receiving the instruction for starting the second job, after performing the second initial operation, the controller controls the current to be supplied to the winding of the second motor in such a manner that the rotor of the second motor having been in the second stop state rotates based on the phase determined by the second initial operation.

3. The image forming apparatus according to claim 2, wherein the conveyance roller is a discharge roller configured to discharge the recording medium to outside the image forming apparatus.

4. The image forming apparatus according to claim 2, wherein the second motor is a brushless direct-current (DC) motor.

5. The image forming apparatus according to claim 1, further comprising:
a conveyance roller provided downstream of the pickup roller in a conveyance direction in which the recording medium is conveyed, and configured to convey the recording medium fed by the pickup roller; and
a second motor configured to drive the conveyance roller,
wherein the controller performs a second initial operation upon receiving the instruction for starting the first job, in the second initial operation, the controller supplying current to a winding of the second motor in a second stop state in which a rotor of the second motor is at a stop and determining a phase of the rotor of the second motor having been in the second stop state based on the current flowing through the winding of the second motor,
wherein the controller controls the current to be supplied to the winding of the second motor in such a manner that the rotor of the second motor having been in the second stop state rotates, based on the phase determined by the second initial operation,
wherein, upon stopping rotation of the rotor of the second motor, the controller controls the current to be supplied to the winding of the second motor in such a manner that the rotor of the second motor is held at a second phase, and
wherein, in a case where a time shorter than the first predetermined time elapses from when the rotor of the second motor is held at the second phase, the controller stops supplying the current to the winding of the second motor.

6. The image forming apparatus according to claim 5, wherein the conveyance roller is a discharge roller configured to discharge the recording medium to outside the image forming apparatus.

7. The image forming apparatus according to claim 5, wherein the second motor is a brushless direct-current (DC) motor.

8. The image forming apparatus according to claim 1, further comprising an operation unit configured to be operated by a user and to set an image forming condition to be used by the image forming unit,
wherein, in a case where the operation unit has been operated during the first period, the controller controls the current to be supplied to the winding in such a manner that the rotor is held at the first phase for a period longer than the first predetermined time.

9. The image forming apparatus according to claim 1, further comprising a detecting sensor configured to detect an object with use of an infrared sensor,
wherein, in a case where the detecting sensor has detected the object during the first period, the controller controls the current to be supplied to the winding in such a manner that the rotor is held at the first phase for a period longer than the first predetermined time.

10. The image forming apparatus according to claim 1, wherein, in a case where feeding of a final recording medium in the first job by the pickup roller is completed as ending of the first job, the controller controls the current to be supplied to the winding in such a manner that the rotor is held at the first phase.

11. The image forming apparatus according to claim 1, wherein, in a case where image formation on a final recording medium in the first job by the image forming unit is completed as ending of the first job, the controller controls the current to be supplied to the winding in such a manner that the rotor is held at the first phase.

12. The image forming apparatus according to claim 1, wherein, in a case where a final recording medium in the first job is discharged to outside the image forming apparatus as ending of the first job, the controller controls the current to be supplied to the winding in such a manner that the rotor is held at the first phase.

13. The image forming apparatus according to claim 1,
wherein the image forming apparatus has a first electric power mode which is a state in which image formation by the image forming unit is ready to be performed and a second electric power mode which is a state in which power consumption is smaller than in the first electric power mode and image formation by the image forming unit is unready to be performed,
wherein the controller maintains the first electric power mode during a second period until a second predetermined time elapses from when the image forming job ends,
wherein, in a case where the instruction for starting the second job is not received during the second period, the controller switches an electric power mode from the first electric power mode to the second electric power mode after the second period, and wherein the first predetermined time is shorter than or equal to the second predetermined time.

14. The image forming apparatus according to claim 1, wherein the first motor is a brushless direct-current (DC) motor.

15. The image forming apparatus according to claim 1, wherein the controller is configured to perform further operations including:
detecting the current flowing through the winding of the first motor, and
determining a rotational phase of the rotor based on the detected current,
wherein the controller starts rotation of the rotor having been in the first stop state by supplying current with a predetermined magnitude to the winding based on the phase determined by the first initial operation, and
wherein, in a case where a value corresponding to a rotational speed of the rotor becomes larger than a predetermined value after starting of rotation of the rotor of the first motor, the controller starts control of the first motor by vector control and, in the vector control, the controller controls the current flowing through the winding based on (i) a torque current component which is a current component represented on a rotating coordinate system that is based on the determined rotational phase and which is a current component for causing the rotor to generate a torque, and (ii) an excitation current component which is a current component represented on the rotating coordinate system and which is a current component affecting an intensity of a magnetic flux penetrating through the winding.

16. The image forming apparatus according to claim 15, wherein, in the vector control, the controller sets a target value of the torque current component in such a manner that a deviation between the determined rotational phase and a command phase indicating a target phase of the rotor of the first motor becomes small, and
wherein, in the vector control, the controller controls the current flowing through the winding in such a manner that a deviation between a value of the torque current component of the detected current and the target value of the torque current component becomes small.

17. The image forming apparatus according to claim 15, wherein the controller determines a rotational speed of the rotor of the first motor,
wherein, in the vector control, the controller sets a target value of the torque current component in such a manner that a deviation between the determined rotational speed and a command speed indicating a target speed of the rotor of the first motor becomes small, and
wherein, in the vector control, the controller controls the current flowing through the winding in such a manner that a deviation between a value of the torque current component of the detected current and the target value of the torque current component becomes small.

18. The image forming apparatus according to claim 15, wherein a value corresponding to a rotational speed of the rotor corresponds to a target speed of the rotor.

19. An image forming apparatus comprising:
a stacking portion on which a recording medium is to be stacked;
a pickup roller configured to feed the recording medium stacked on the stacking portion;
a first motor configured to drive the pickup roller;
an image forming unit configured to form an image on the recording medium fed by the pickup roller; and
a controller configured to perform operations including:
receiving an instruction for starting an image forming job for forming the image on the recording medium,
detecting current flowing through a winding of the first motor,
performing a first initial operation upon receiving an instruction for starting a first job serving as the image forming job, wherein, in the first initial operation, the controller supplies current to the winding of the first motor in a first stop state in which a rotor of the first motor is at a stop and determines a phase of the rotor having been in the first stop state based on the current flowing through the winding of the first motor,
starting rotation of the rotor having been in the first stop state by supplying current with a predetermined magnitude to the winding based on the phase determined by the first initial operation,
determining a rotational phase of the rotor based on the detected current, and
starting, in a case where a value corresponding to a rotational speed of the rotor becomes larger than a predetermined value after starting of rotation of the rotor of the first motor, control of the first motor by vector control and, in the vector control, the controller controls the current flowing through the winding based on (i) a torque current component which is a current component represented on a rotating coordinate system that is based on the determined rotational phase and which is a current component for causing the rotor to generate a torque, and (ii) an excitation current component which is a current component represented on the rotating coordinate system and which is a current component affecting an intensity of a magnetic flux penetrating through the winding,
wherein, in a case where the first job ends, the controller controls current to be supplied to the winding in such a manner that the rotor is held at a first phase,
wherein, upon receiving an instruction for starting a second job serving as the image forming job within a period until a predetermined time elapses from when the rotor is held at the first phase due to the ending of the first job, the controller starts rotation of the rotor having been held by supplying the current with the predetermined magnitude to the winding without performing the first initial operation, and
wherein, upon not receiving the instruction for starting the second job within the period, the controller stops supplying the current to the winding.

20. The image forming apparatus according to claim 19, further comprising:
a conveyance roller provided downstream of the pickup roller in a conveyance direction in which the recording medium is conveyed, and configured to convey the recording medium fed by the pickup roller; and
a second motor configured to drive the conveyance roller,
wherein the controller performs a second initial operation upon receiving the instruction for starting the first job, in the second initial operation, the controller supplying current to a winding of the second motor in a second stop state in which a rotor of the second motor is at a stop and determining a phase of the rotor of the second motor having been in the second stop state based on the current flowing through the winding of the second motor,
wherein the controller controls the current to be supplied to the winding of the second motor in such a manner that the rotor of the second motor having been in the second stop state rotates, based on the phase determined by the second initial operation, wherein, upon stopping rotation of the rotor of the second motor, the controller stops supplying the current to the winding of the second motor, and wherein, upon receiving the instruction for starting the second job, after performing the second initial operation, the controller controls the current to be supplied to the winding of the second motor in such a manner that the rotor of the second motor having been in the second stop state rotates based on the phase determined by the second initial operation.

21. The image forming apparatus according to claim 20, wherein the conveyance roller is a discharge roller configured to discharge the recording medium to outside the image forming apparatus.

22. The image forming apparatus according to claim 20, wherein the second motor is a brushless direct-current (DC) motor.

23. The image forming apparatus according to claim 19, further comprising:
- a conveyance roller provided downstream of the pickup roller in a conveyance direction in which the recording medium is conveyed, and configured to convey the recording medium fed by the pickup roller; and
- a second motor configured to drive the conveyance roller,
wherein the controller performs a second initial operation upon receiving the instruction for starting the first job, in the second initial operation, the controller supplying current to a winding of the second motor in a second stop state in which a rotor of the second motor is at a stop and determining a phase of the rotor of the second motor having been in the second stop state based on the current flowing through the winding of the second motor, wherein the controller controls the current to be supplied to the winding of the second motor in such a manner that the rotor of the second motor having been in the second stop state rotates, based on the phase determined by the second initial operation, wherein, upon stopping rotation of the rotor of the second motor, the controller controls the current to be supplied to the winding of the second motor in such a manner that the rotor of the second motor is held at a second phase, and wherein, in a case where a time shorter than the predetermined time elapses from when the rotor of the second motor is held at the second phase, the controller stops supplying the current to the winding of the second motor.

24. The image forming apparatus according to claim 23, wherein the conveyance roller is a discharge roller configured to discharge the recording medium to outside the image forming apparatus.

25. The image forming apparatus according to claim 23, wherein the second motor is a brushless direct-current (DC) motor.

26. The image forming apparatus according to claim 19, further comprising an operation unit configured to be operated by a user and to set an image forming condition to be used by the image forming unit, wherein, in a case where the operation unit has been operated during the period, the controller controls the current to be supplied to the winding in such a manner that the rotor is held at the first phase for a period longer than the predetermined time.

27. The image forming apparatus according to claim 19, further comprising a detecting sensor configured to detect an object with use of an infrared sensor, wherein, in a case where the detecting sensor has detected the object during the period, the controller controls the current to be supplied to the winding in such a manner that the rotor is held at the first phase for a period longer than the predetermined time.

28. The image forming apparatus according to claim 19, wherein, in a case where feeding of a final recording medium in the first job by the pickup roller is completed as ending of the first job, the controller controls the current to be supplied to the winding in such a manner that the rotor is held at the first phase.

29. The image forming apparatus according to claim 19, wherein, in a case where image formation on a final recording medium in the first job by the image forming unit is completed as ending of the first job, the controller controls the current to be supplied to the winding in such a manner that the rotor is held at the first phase.

30. The image forming apparatus according to claim 19, wherein, in a case where a final recording medium in the first job is discharged to outside the image forming apparatus as ending of the first job, the controller controls the current to be supplied to the winding in such a manner that the rotor is held at the first phase.

31. The image forming apparatus according to claim 19, wherein the first motor is a brushless direct-current (DC) motor.

32. The image forming apparatus according to claim 19,
- wherein, in the vector control, the controller sets a target value of the torque current component in such a manner that a deviation between the determined rotational phase and a command phase indicating a target phase of the rotor of the first motor becomes small, and
- wherein, in the vector control, the controller controls the current flowing through the winding in such a manner that a deviation between a value of the torque current component of the detected current and the target value of the torque current component becomes small.

33. The image forming apparatus according to claim 19,
- wherein the controller determines a rotational speed of the rotor of the first motor,
- wherein, in the vector control, the controller controls the current flowing through the winding in such a manner that a deviation between the determined rotational speed and a command speed indicating a target speed of the rotor of the first motor becomes small, and
- wherein, in the vector control, the controller controls the current flowing through the winding in such a manner that a deviation between a value of the torque current component of the detected current and the target value of the torque current component becomes small.

34. The image forming apparatus according to claim 19, wherein a value corresponding to a rotational speed of the rotor corresponds to a target speed of the rotor.

* * * * *